US006850340B1

(12) United States Patent
    Ohshita

(10) Patent No.: US 6,850,340 B1
(45) Date of Patent: Feb. 1, 2005

(54) IMAGE DATA PROCESSING METHOD AND APPARATUS

(75) Inventor: Masakazu Ohshita, Kawasaki (JP)

(73) Assignee: Ricoh Company, Ltd., Tokyo-to (JP)

( * ) Notice: Subject to any disclaimer, the term of this patent is extended or adjusted under 35 U.S.C. 154(b) by 748 days.

(21) Appl. No.: 09/583,715

(22) Filed: May 30, 2000

(30) Foreign Application Priority Data

Jun. 10, 1999 (JP) ............................................ 11-163940

(51) Int. Cl.$^7$ .......................... G06F 15/00; G06K 15/02
(52) U.S. Cl. ......................... 358/1.2; 358/1.3; 358/1.7; 358/448; 358/451; 358/2.99
(58) Field of Search .......................... 358/1.2, 1.3, 1.7, 358/2.99, 451, 448, 3.1, 3.11, 3.12, 3.13, 3.14, 3.15, 463, 447, 532

(56) References Cited

U.S. PATENT DOCUMENTS

| | | | |
|---|---|---|---|
| 4,847,641 A | | 7/1989 | Tung |
| 5,327,260 A | * | 7/1994 | Shimomae et al. ......... 358/448 |
| 5,650,858 A | | 7/1997 | Lund |
| 5,751,929 A | | 5/1998 | Ohnuma et al. |
| 5,926,616 A | * | 7/1999 | Sato et al. .................... 358/1.2 |

FOREIGN PATENT DOCUMENTS

| | | |
|---|---|---|
| DE | 44 22 837 | 2/1995 |
| JP | 2-112966 | 4/1990 |
| JP | 5-207282 | 8/1993 |
| JP | 7-87321 | 3/1995 |

\* cited by examiner

*Primary Examiner*—Edward Coles
*Assistant Examiner*—Chan S. Park
(74) *Attorney, Agent, or Firm*—Oblon, Spivak, McClelland, Maier & Neustadt, P.C.

(57) ABSTRACT

A method and apparatus for processing original image data that is bit mapped in a main-scanning direction X and a sub-scanning direction Y first multiplies linearly aligned dots in the main-scanning direction X of the original bit mapped image data by a positive integer Dy to generate Dy lines of linearly aligned dots adjoining each other in the sub-scanning direction Y as a first group of the subscanning direction Y. Other functions include second multiplying following linearly aligned dots in the main-scanning direction X of the original bit mapped image data by a positive integer Ry to generate Ry lines of linearly aligned dots adjoining each other in the sub-scanning direction Y as a second group of the sub-scanning direction Y, and multiplying further following linearly aligned dots in the main-scanning direction X of the original bit mapped image data by repeating the above first and second multiplying steps.

25 Claims, 15 Drawing Sheets

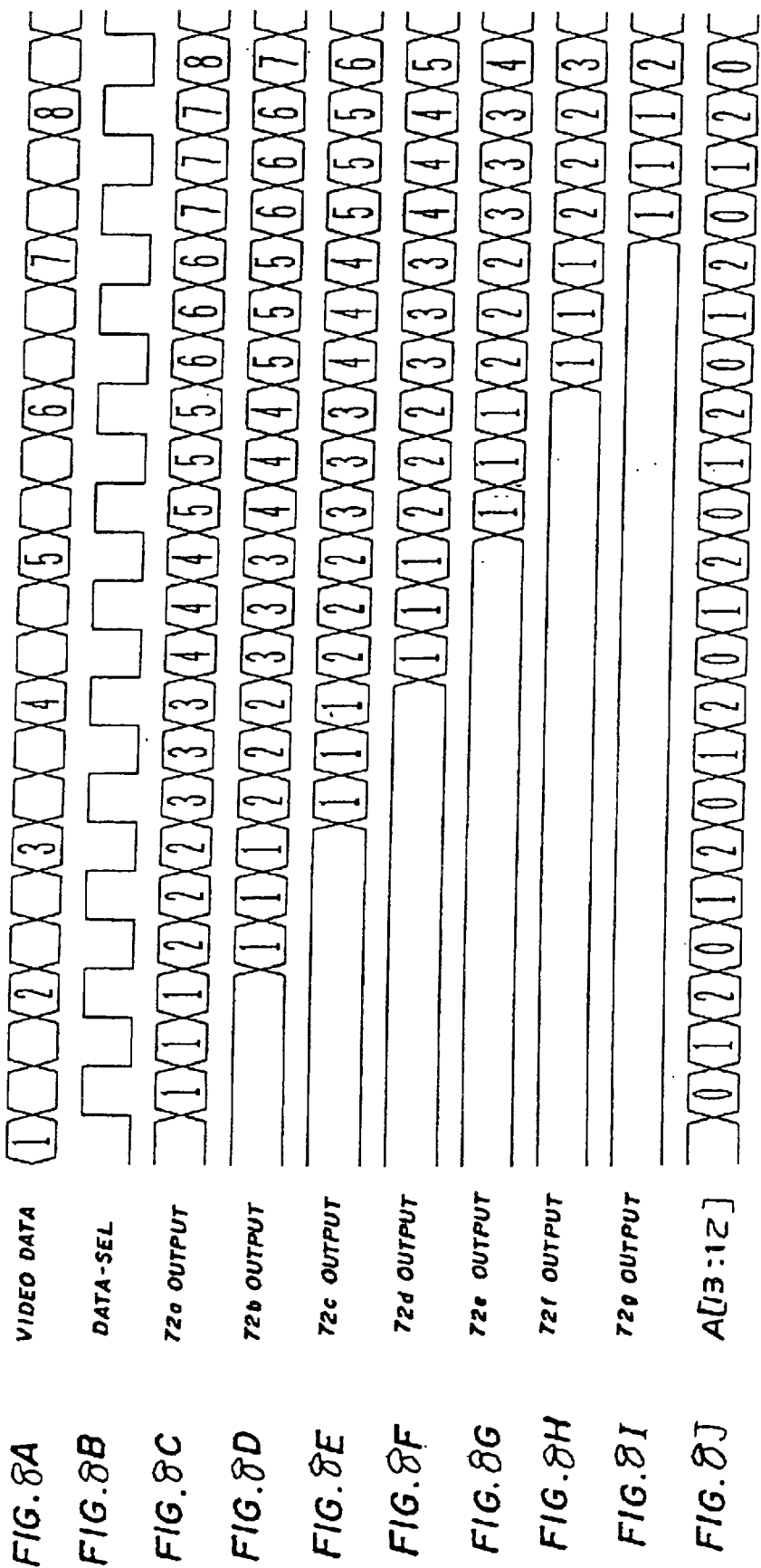

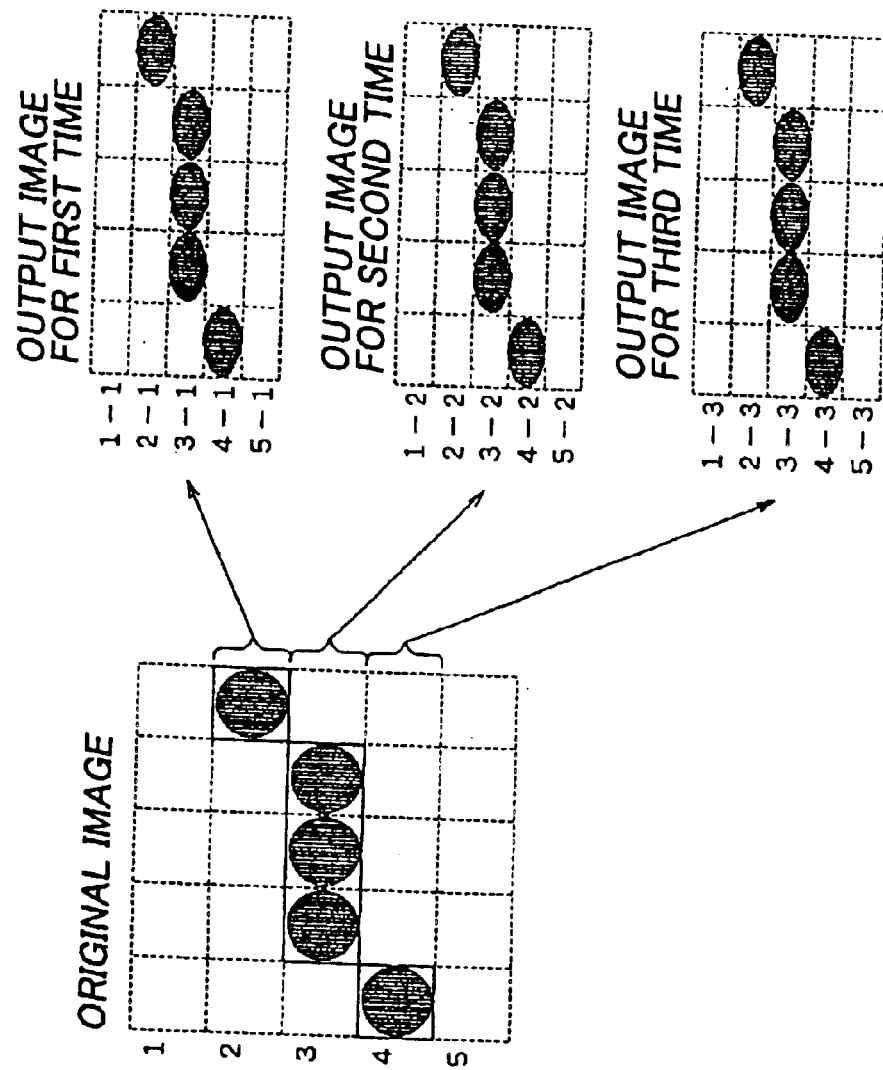

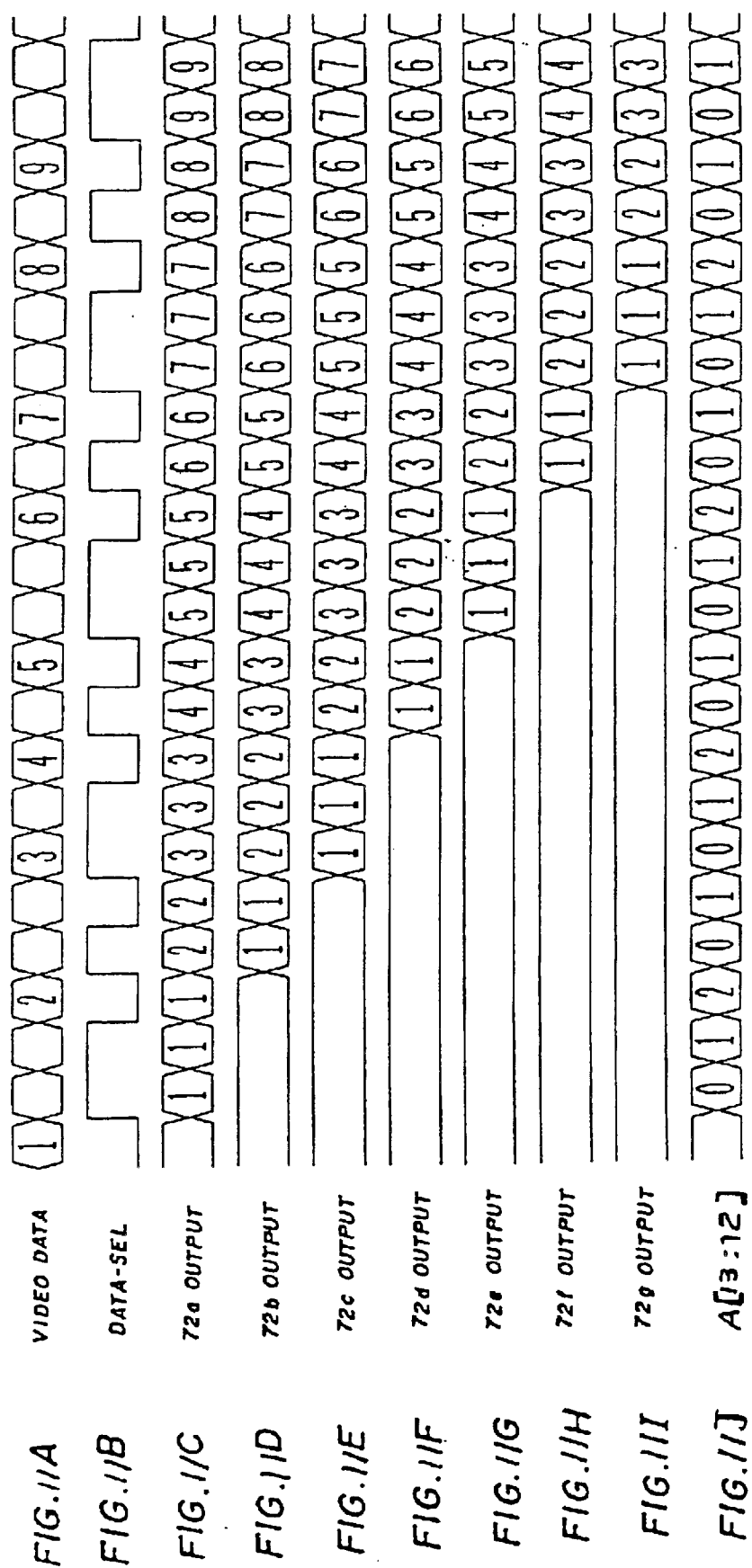

IMAGE DATA PROCESSING METHOD AND APPARATUS

BACKGROUND OF THE INVENTION

1. Field of the Invention

The present invention relates to an image data processing method and apparatus. More particularly, the present invention relates to an image data processing method and apparatus that converts an image resolution of image data into a higher one. The image data processing method and apparatus can be applied to an optical printer such as a laser printer, an electrographic image forming apparatus such as a digital photocopier, a plain paper facsimile machine, an image display device, etc.

2. Discussion of the Background

An image formed by an image forming device and image display device according to a digital image signal or image data is produced as an aggregation of a plurality of discrete dots or picture elements (pixels). Such dots or pixels are generally allocated as a matrix state, and therefore such an image is sometimes referred as a dot matrix image or a bit mapped image.

As one characteristic of bit mapped images, image resolution is defined and measured as dots per inch (dpi), as an example. Image resolution generally varies depending on image input devices, such as an image scanner, and also varies depending on image output devices, such as a laser printer and a monitor display. Further, application programs implemented in computers, such as a word processing program, a drawing program, a computer aided design (CAD) program, a spread sheet program, an e-mail program, a database program, etc., generate images in various image resolutions. Those images can also be categorized as input images or original images for image output devices.

Therefore, image resolution of an original image generated by an image input device or an application program and image resolution of an image output device are sometimes different from each other. Therefore, in such cases, the image resolution of the input image is converted into another image resolution, i.e., image resolution of the image output device, to reproduce an image of a preferable size.

A higher resolution image has more dots than a lower resolution image per unit area; therefore the higher resolution image has greater data than the lower resolution image for the same size images.

Each dot of a bit mapped image has characteristics such as location coordinates, intensity, color, and size. Each characteristic is independent of the other characteristics and can be viewed as an independent dimension. For example, regarding sizes or intensities of dots, bit mapped images are categorized into bi-level (binary) images such as text and character strings and line images, and multi-level (gray scale) images such as pictures and photographs. Even a single page image may include both binary images and gray scale images.

Image components of an analog image may be continuous in any orientation, while those of a bit mapped image must proceed in orthogonal, incremental steps. This constraint results in distortion in the bit map representation of an analog image. For example, diagonal lines and boundaries between different regions of printer dots produce jagged steps or a staircase distortion, which is quite visible to the human eye. The jagged steps or staircase distortion are also referred as a jagged image.

Either an image reduction by a thinning out operation of dots or an image enlargement by a dot embedding operation often causes such jagged steps. Similarly, when a high resolution image is converted into a low resolution image, the resolution conversion may cause jagged steps or staircase distortion as well.

Methods for reducing or correcting for jagged steps or staircase distortion are known. As an example, U.S. Pat. No. 4,544,922 describes that an original image is first converted into an output image having a higher resolution than that of the original image, then image outlines, such as diagonal lines and boundaries between different regions of printer dots, are processed by a smoothing operation, a rounding operation, an embedding operation for hollows of steps, etc.

As another example, Japanese Laid-Open Patent Application No. 2-112966 describes a jagged image correction method. The method provides a dot pattern sampling window for sampling dots in a focusing region, i.e., dots including a target dot, i.e., a dot to be processed at the moment, and a plurality of surrounding dots. Then, the sampled dot pattern is compared with a plurality of matching dot patterns or templates. Then, the target dot is uniquely processed associated with a coincident matching dot pattern.

As still another example, Japanese Laid Open Patent No. 5-207282 describes an image improving method that corrects boundaries between a black dot region and a white dot region of a bit mapped image. The method provides a recognition step of recognizing shapes of boundaries between a black dot region and a white dot region of the bit mapped image, and a converting step of converting the recognized shapes of boundaries into code information composed by plural bits. The method then determines whether each dot should be corrected based on at least a part of the code information, and corrects the correction required dot according to the code information. The method reduces data size for the correction to be stored in advance in a memory. Further, the method determines the required correction dot for correction data in a short time, only by using a relatively simple determining operation and other operations that can be executed by, e.g., a microprocessor.

Japanese Laid Open Patent No. 5-207282 further describes an image data processing apparatus that executes the above-described image improving method. The apparatus provides a dot pattern sampling window for sampling a target dot and a plurality of surrounding dots. The apparatus also provides a pattern recognition device for recognizing shapes of boundaries between a black dot region and a white dot region of the bit mapped image based on the sampled dot pattern and generates plural bit code information representing the recognized shape.

The apparatus further provides a determining device that determines whether the target dot should be corrected based on at least a part of the generated code information, and a correction data memory to store correction data therein in advance. The address input to the correction data memory is connected to the generated code information, and thereby the correction data memory is accessed to output the stored correction data for the correction required target dot according to the generated code information.

The above-described image data processing method and apparatus do not require storing all templates corresponding to all dot distribution patterns characterized for determining correction required dots. Thus, the image data processing method and apparatus can achieve the determining process of a correction required dot and correction data thereof in a short time according to the generated code information.

As a further example, Japanese Laid Open Patent No. 7-087321 describes an image data processing method that can improve the above-described method of Japanese Laid Open Patent No. 5-207282. The image data processing method performs, by steps (a)–(d) below, an image enlarging operation and an image resolution converting operation as well as the above-described jagged image correcting operation by adding optional information regarding a main-scanning direction X and a sub-scanning direction Y to the above-described code information.

(a) The method first multiplies dots of an original bit mapped image to the main-scanning direction X and to the sub-scanning direction Y such that linearly aligned dots in the main-scanning direction X of the original bit mapped image are multiplied by a positive integer Dr adjoining each other in the sub-scanning direction Y.

(b) The method then recognizes shapes of boundaries between a black dot region and a white dot region in a region including a target dot and surrounding dots in the original bit mapped image, and then generates code information characterized by the shapes of boundaries according to the recognition. The method repeats the above steps for each dot in the original image data one after the other.

(c) Following that, the method counts the multiplied dots at an identical location in sub-scanning direction Y as a count A[15:16] and initializes the count A[15:16] to zero when the count A[15:16] reaches the positive integer Dr. The method repeats the counting and initializing process.

(d) The method then outputs dot data corresponding to the code information and the count A[15:16] to the multiplied dot.

The above-described steps (a) to (d) simultaneously perform an image enlargement in the sub-scanning direction Y or an image resolution conversion and a jagged image correction.

As an example, an image resolution conversion into a lower resolution and an image size conversion into a reduced image are performed by a thinning out operation of dots in an original image. For the thinning out operation, the original image data is once stored in a memory, and a reading operation for the stored data is controlled such that a reading operation for specific dot data is skipped. Conversely, an image resolution conversion into a higher resolution and an image size conversion into an enlarged image are performed by an embedding operation of dots into the original image. For the embedding operation, the original image data is once stored in a memory, and a reading operation for the stored data is controlled such that a multiple reading operation for specific identical data of dots is executed.

When an image resolution of original image data and an image resolution of an image output device, such as a printer or a display device, are fixed values, an image reduction and enlargement are relatively simply performed by the above described dot thinning out and dot embedding operations. However, image resolutions of original images have been diversifying these days, and many printers provide a plurality of resolutions to be selected as well. As recognized by the present inventor, an image data conversion for satisfying various image resolutions of original images, a required image resolution of an image output device, and a required magnification ratio has become burdensome.

SUMMARY OF THE INVENTION

The present invention has been made in view of the above-discussed and other problems and one object of the present invention is to overcome the above-discussed and other problems associated with the background methods and apparatuses.

A further object of the present invention is to provide a novel image data processing method and apparatus that can generate versatile images over a relatively wide range of magnification ratios from original image data.

Another object of the present invention is to provide a novel image data processing method and apparatus that can generate a required output image resolution satisfying a required magnification ratio from various input image resolutions in a relatively simple manner.

A further object of the present invention is to provide a novel image data processing method and apparatus that can generate versatile magnification images of which image quality is enhanced by correcting jagged images.

To achieve these and other objects, the present invention provides a novel method and apparatus for processing original image data that is bit mapped in a main-scanning direction X and a sub-scanning direction Y including multiplying linearly aligned dots in the main-scanning direction X of the original bit mapped image data by a first positive integer Dy to generate Dy lines of linearly aligned dots adjoining each other in the subscanning direction Y as a first group of the sub-scanning direction Y. Other functions include multiplying following linearly aligned dots in the main-scanning direction X of the original bit mapped image data by a second positive integer Ry to generate Ry lines of linearly aligned dots being adjoining each other in the sub-scanning direction Y as a second group of the sub-scanning direction Y, and multiplying further following linearly aligned dots in the main-scanning direction X of the original bit mapped image data by repeating the above two multiplying steps.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 8A, 8B, 8C, 8D, 8E, 8F, 8G, 8H, 8I, and 8J are timing diagrams illustrating a transition of output data from a line buffer to the sampling window at an exemplary state of circulatory outputting operations;

FIG. 9 is a diagram illustrating a relationship between original image data indexed by a line number and circulatory output image data indexed by line numbers and repetitive output numbers thereof when each line of the original image data is circularly output from a FIFO memory as multiplied three lines of image data according to the circulatory outputting operations illustrated in FIGS. 8A to 8J;

FIGS. 11A, 11B, 11C, 11D, 11E, 11F, 11G, 11H, 11I, and 11J are timing diagrams illustrating a transition of output data from a line buffer to the sampling window in another exemplary state of circulatory outputting operations;

DESCRIPTION OF THE PREFERRED EMBODIMENTS

Figure 1:
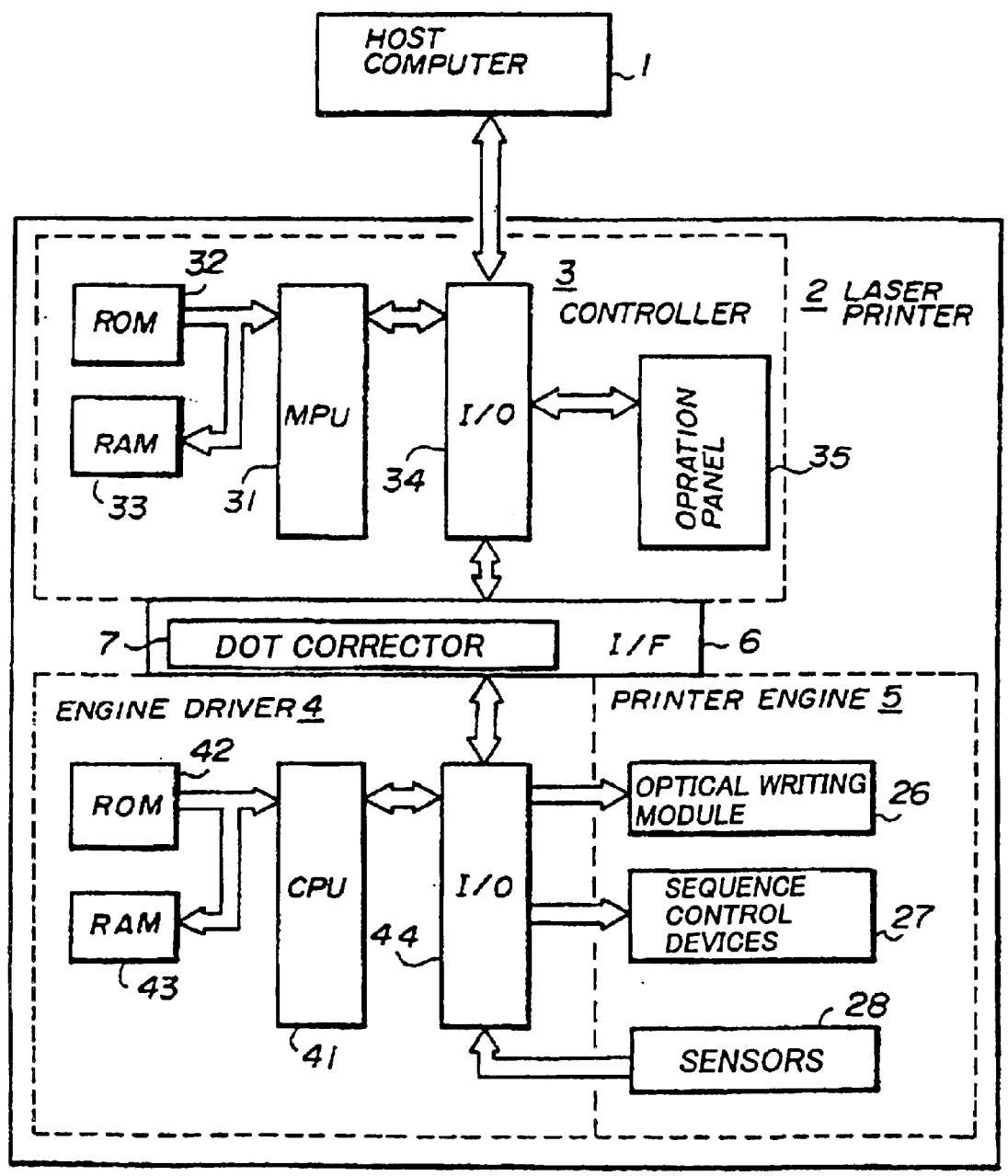
FIG. 1 is a block diagram illustrating a laser printer to which the image processing apparatus of the present invention is applied.

Referring now to the drawings, wherein like reference numerals designate identical or corresponding parts throughout the several views, and more particularly to FIG. 1 thereof, a block diagram of a laser printer 2 as an example of an image processing apparatus to which the present invention can be applied is illustrated. The laser printer 2 includes a controller 3, an engine driver 4, a printer engine 5, and an internal interface (I/F) 6. The printer 2 receives print data from a host computer 1. The controller 3 converts the received print data into divided bit map data each of which is allocated on a page, and further converts the bit map data into dot data to form a hard copy image. The controller 3 then transmits the dot data to the engine driver 4 via the internal interface (I/F) 6. In accordance with receiving the dot data or video data, which is modified dot data, the engine driver 4 sequentially controls the printer engine 5 so as to form a toner image on a sheet of paper. In this example, the image processing apparatus of the present invention is implemented in the internal interface (I/F) 6.

The controller 3 includes a microcomputer (MPU) 31, a read-only memory (ROM) 32, a random access memory (RAM) 33, an input and output device (I/O) 34, and an operation panel 35. The read-only memory (ROM) 32 stores program codes, constant data, font data, etc., to supply to the microcomputer (MPU) 31. The random access memory (RAM) 33 stores general data, dot patterns, etc. The input and output device (I/O) 34 controls input signals and data, and output signals and data. Those components of the controller 3 are connected to each other by a data bus, an address bus, a control bus, etc.

The host computer 1 and the internal interface (I/F) 6, which includes a dot corrector 7, are also connected to the MPU 31 via the input and output device (I/O) 34 and the data and address buses.

The engine driver 4 includes a secondary microcomputer (CPU) 41, a read-only memory (ROM) 42, a random access memory (RAM) 43, and an input and output device (I/O) 44. The read-only memory (ROM) 42 stores program codes, constants data, etc., to supply to the secondary microcomputer (CPU) 41. The random access memory (RAM) 43 stores temporary data. The input and output device (I/O) 44 controls input signals and data, and output signals and data. Those components of the engine driver 4 are connected to each other by a data bus, an address bus, a control bus, etc.

The input and output device (I/O) 44 of the engine driver 4 is connected to the internal interface (I/F) 6, and receives video data from the controller 3 and status signals of switches disposed on the operation panel 35. The input and output device (I/O) 44 also transmits a video clock signal, which is denoted as WCLK, and status signals, such as an end-of-paper signal, to the controller 3. The input and output device (I/O) 44 is also connected to an optical writing module 26 in the printer engine 5, sequence control devices 27, and sensors 28 including a synchronizing sensor, which are described later.

The printer engine 5 includes an optical writing module 26, sequence control devices 27, and sensors 28.

The controller 3 receives a print command and print data such as text data and graphic data from the host computer 1. The controller 3 then converts the received print data into bit mapped image data, and allocates the original bit mapped image data of the texts and graphics in a bit mapped image data area of the RAM 33 page by page. When the controller 3 converts text data into bit mapped data, the controller 3 uses the font data stored in the ROM 32.

In response to a ready-state signal and the video clock signal WCLK received from the engine driver 4, the controller 3 transmits the bit mapped image data stored in the bit mapped image data area of the RAM 33 as dot data to the engine driver 4 via the internal interface (I/F) 6 in synchronism with the video clock signal WCLK. During the transmission, the dot corrector 7 performs a dot correcting operation, i.e., a correction for each dot included in the bit mapped image data being sent to the engine driver 4, which is described later.

The operation panel 35 of the controller 3 provides switches to receive instructions for controlling the print data by an operator of the laser printer 2, and transmits the received instructions to the engine driver 4. The operation panel 35 also provides indicators to indicate the status of the laser printer 2 to the operator.

The engine driver 4 sequentially controls the printer engine 5 including the optical writing module 26 and the sequence control devices 27, such as an electric charging device and a developing device according to the received video data, of which dots are being corrected, from the internal interface (I/F) 6. The engine driver 4 then transmits the video data to the optical writing module 26 for the optical writing operation of the image. Further, the engine driver 4 receives signals output from the sensors 28 each indicating a respective status of a part or a section of the printer engine 5, such as a synchronizing signal, and outputs status signals, such as an end-of-paper signal, to the controller 3 via the internal interface (I/F) 6.

Figure 2:
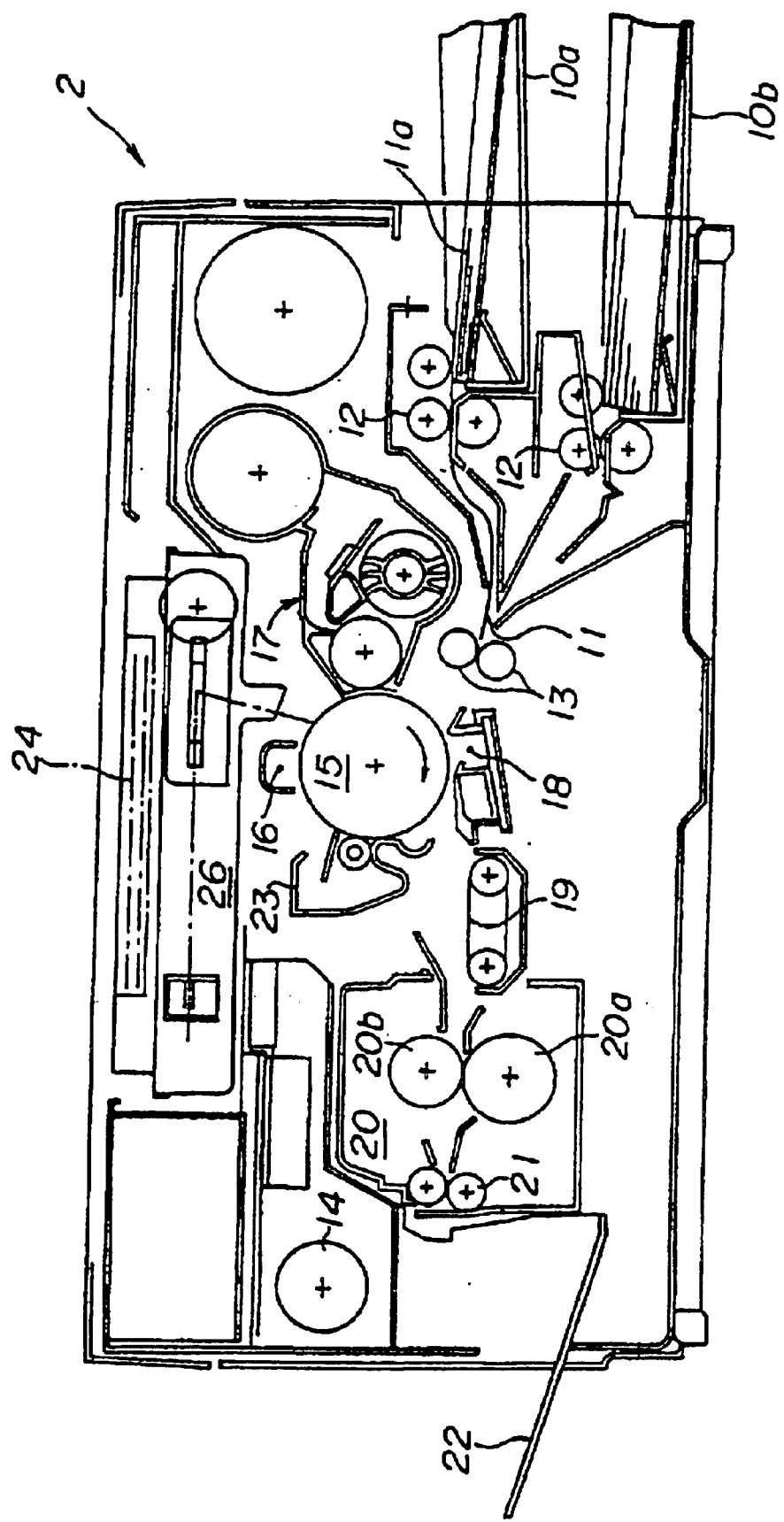
FIG. 2 is a schematic sectional view illustrating a mechanical part of the laser printer of FIG. 1.

FIG. 2 is a schematic sectional view illustrating a mechanical part of the laser printer 2 of FIG. 1. Referring to FIG. 2, the laser printer 2 includes an upper paper cassette 10a stacked with sheets of papers 11a, a lower paper cassette 10b, paper feed rollers 12, a register roller pair 13, a main motor 14, a photosensitive drum 15 surrounded by a charging device 16, a developing device 17, a transfer device 18, and a cleaning device 23. The laser printer 2 further includes a transport belt 19, a fixing device 20, an exit roller pair 21, a paper tray 22, a plurality of printed circuit boards 24, and an optical writing module 26.

Either one of the paper feed rollers 12 feeds a sheet 111 out from the upper or lower paper cassettes 10a or 10b and supplies the sheet 11 to the register roller pair 13. After a timing adjustment for synchronizing the leading edge of the sheet 11 and the leading edge of a toner image on the photoconductive drum 15, the register roller pair 13 transports the sheet 11 to a location where the transfer device 18 opposes the photoconductive drum 15.

Meanwhile, while the main motor 14 rotates the photoconductive drum 15 clockwise, the charging device 16 electrically charges the surface of the photoconductive drum 15 to a substantially uniform voltage. The optical writing module 26 irradiates the charged surface of the photoconductive drum 15 with a scanning light spot modulated by a pulse width modulation (PWM) according to the input video data, and thereby an electrostatic latent image is formed on the photoconductive drum 15. The developing device 17 develops the latent image, and a toner image is thus formed on the photoconductive drum 15.

The transfer device 18 transfers the toner image on the photoconductive drum 15 onto the sheet 11 being transported by the register roller pair 13. The sheet 11 is then separated from the photoconductive drum 15, and the transport belt 19 further transports the sheet 11 having the toner image to the fixing device 20. The fixing device 20 includes a pressure roller 20a and a heating roller 20b. The fixing device 20 fixes the toner image on the sheet 11 with heat and pressure applied by the heating roller 20b and the pressure roller 20a. Then, the exit roller pair 21 discharges the sheet 11 to the paper tray 22.

Meanwhile, the cleaning device 23 removes residual toner particles from the photoconductive drum 15, i.e., toner particles which have not been transferred to the sheet 11 from the surface of the photoconductive drum 15, and collects the removed toner for reuse, for example.

A plurality of printed circuit boards 24 implement hardware of the controller 3, the engine driver 4, and the internal interface (I/F) 6 and are disposed in an upper portion of the laser printer 2.

Figure 3:
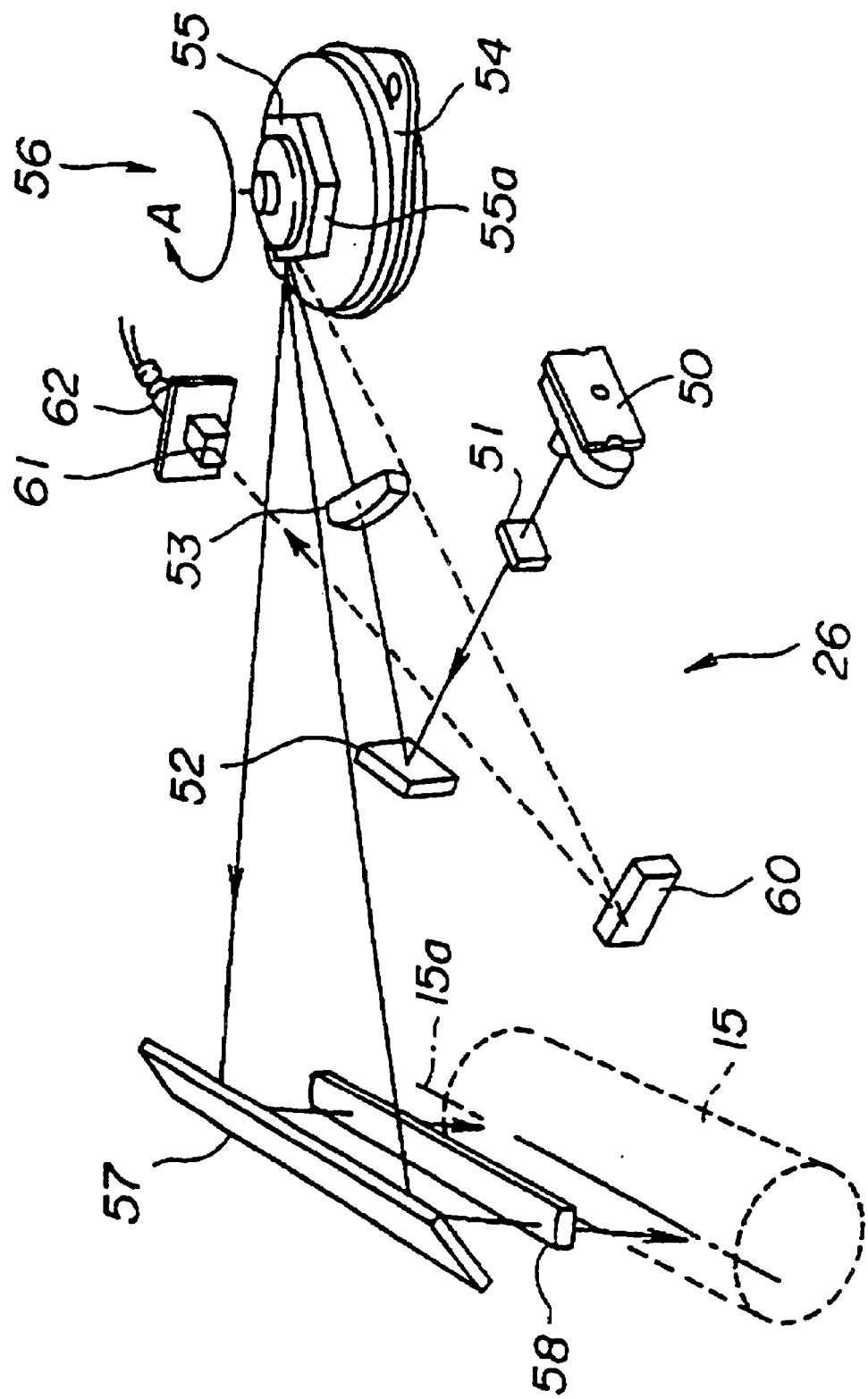
FIG. 3 is a perspective view illustrating an optical writing module of the laser printer of FIG. 1.

FIG. 3 is a perspective view illustrating an optical writing module 26 of the laser printer 2 of FIG. 1. Referring to FIG. 3, the optical writing module 26 includes an exposure system having a laser diode unit 50, a first cylindrical lens 51, a first mirror 52, a focusing lens 53, a rotary deflector 56, a second mirror 57, and a second cylindrical lens 58. The rotary deflector 56 includes a disk type motor 54 and a polygonal mirror 55, which is mounted on the shaft of the motor 54 and rotates in a direction of an arrow A as illustrated. The optical writing module 26 further includes a line synchronization signal generating system having a third mirror 60, a condenser lens 61 of a cylindrical shape, and a synchronizing sensor 62 including a light receiving device.

The laser diode unit 50 may be configured as a single piece having a laser diode (LD) and a collimating lens that collimates a diverging light emitted from the laser diode to obtain a collimated light beam. The first cylindrical lens 51 converges the collimated light emitted from the laser diode unit 50 on the photoconductive drum 15 in a sub-scanning direction Y. The focusing lens 53 converts the collimated light reflected by the first mirror 52 into converging light, and directs the converging light toward the mirror surfaces 55a of the polygonal mirror 55.

The polygonal mirror 55 has a plurality of curved mirror surfaces 55a to reflect the incident light thereon. An optical system that includes a beam converging device upstream from a light deflecting device such as the curved mirror surfaces 55a, and thereby can omit a conventional fθ lens disposed between the polygonal mirror 55 and the second mirror 57, is referred to as a post-objective type optical system. The second mirror 57 reflects a light beam deflected by the rotary deflector 56 toward the photoconductive drum 15, and the reflected light beam passes through the second cylindrical lens 58 and irradiates the photoconductive drum 15 with a sharp spot so as to scan the surface of the photoconductive drum 15 along a main-scanning line 15a as illustrated thereon.

The third mirror 60 is disposed outside the scanning region of the photoconductive drum 15 and reflects the incident light beam from the rotary deflector 56 toward the synchronizing sensor 62. The light beam, which has been reflected by the third mirror 60 and converged by the focusing lens 61, irradiates a light receiving device of the synchronizing sensor 62, for example a photodiode. The light receiving device converts the incident light into an electric signal as a synchronization signal to start each of plural main-scanning lines at substantially the same position on the photoconductive drum 15.

Figure 4:
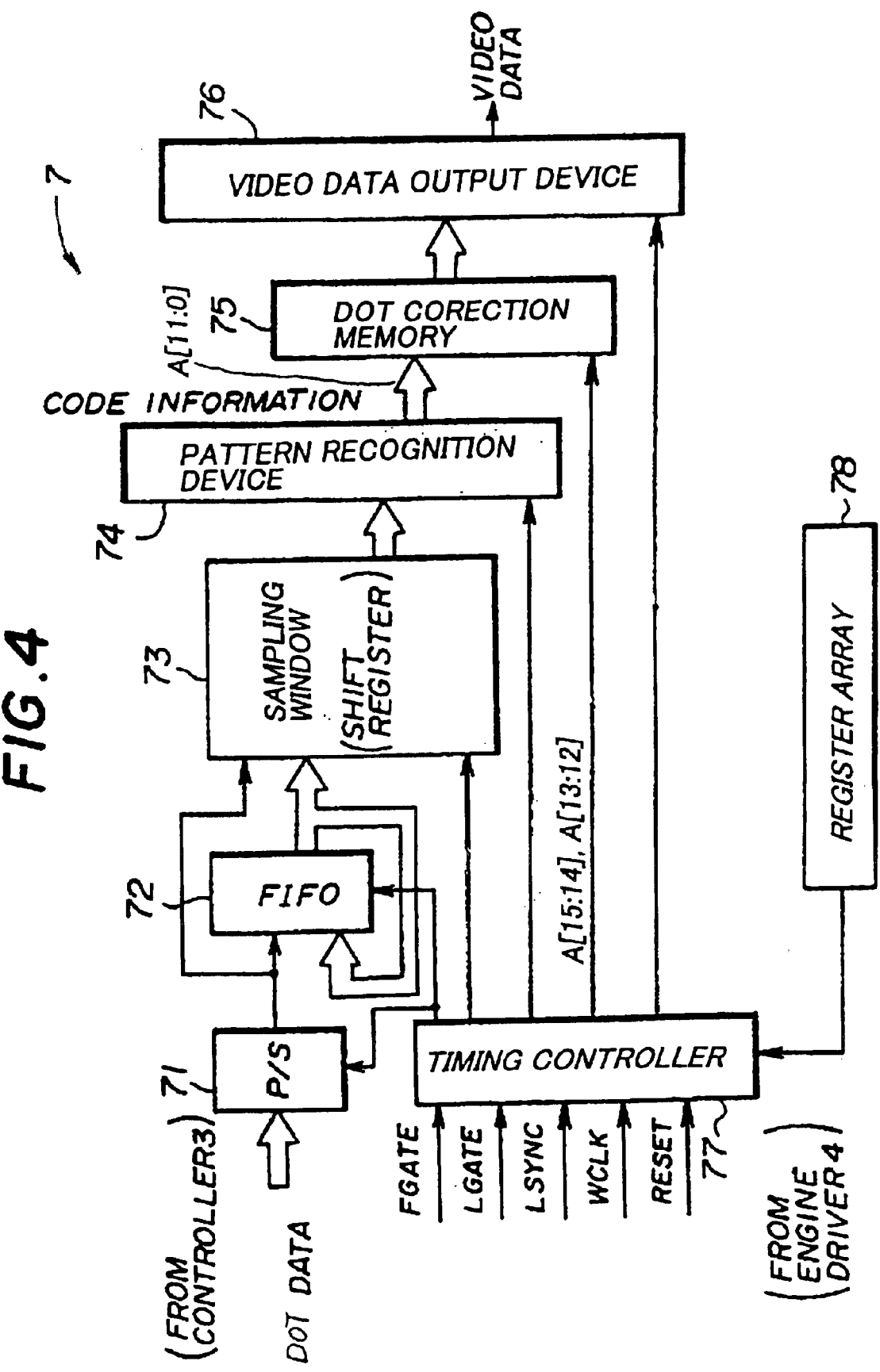
FIG. 4 is a block diagram illustrating a dot corrector.

FIG. 4 is a block diagram illustrating a dot corrector 7 implemented in the internal interface (I/F) 6 of the laser printer 2 of FIG. 1. With reference to FIG. 4, the dot corrector 7 includes a parallel-to-serial converter (P/S) 71, a first-in first-out (FIFO) memory 72, a sampling window 73, a pattern recognition device 74, a dot correction memory 75, a video data output device 76, and a timing controller 77.

The dot corrector 7 receives dot data of an original image in image resolution DPIin from the controller 3, and converts the dot data into video data in image resolution DPIout for printing, which is compatible with the image resolution of the laser printer 2. When the printing image resolution DPIout is greater than the original image resolution DPIin, the dot corrector 7 multiplies each dot in the original image data, for example, by DPIout/DPIin, and thereby printing video data having DPIout/DPIin times dots of the original image data is obtained. The above-described multiplier DPIout/DPIin can be a different value for each of the sub-scanning direction Y and the main-scanning direction X independently.

The dot corrector 7 provides registers (not shown) to store integers Dy, Ry, Dx, and Rx. The integer Dy functions to multiply each dot in odd main-scanning lines by Dy, and the integer Ry functions to multiply each dot in even main-scanning lines by Ry toward the sub-scanning direction Y. Similarly, the integer Dx functions to multiply each dot in odd sub-scanning lines by Dx, and the integer Rx functions to multiply each dot in even sub-scanning lines by Rx toward the main-scanning direction X. Therefore, when a ratio DPIout/DPIin as a multiplier in the sub-scanning direction Y is given, the integers Dy and Ry are set such that (Dy+Ry)/2 equals the given multiplier DPIout/DPIin. Likewise, when a ratio DPIout/DPIin as a multiplier in the main-scanning direction X is given, the integers Dx and Rx are set such that (Dx+Rx)/2 equals the given multiplier DPIout/DPIin. Thus, the original image data is expanded into printing image data having more dots.

The dot corrector 7 further provides a function of correcting dots obtained by the above dot multiplying operation for enhancing the quality of the expanded image by reducing jagged images. For correcting dots, the dot corrector 7 samples a target dot, which is being multiplied at the moment, and surrounding dots thereof, and extracts features of the sampled dots. Then, the dot corrector 7 corrects dots according to the extracted features.

Attention is now turned to each of the function blocks of FIG. 4, which will now be described in more detail. When the dot data transferred from the controller 3 illustrated in FIG. 1 is parallel data (e.g., 8 bit parallel data), the P/S converter 71 converts the parallel data into serial data (1 bit serial data), and sends the converted serial data to the FIFO memory 72. When the dot data transferred from the controller 3 is serial data, no conversion is required, that is, in a sense, the P/S converter 71 is not essentially involved in the dot correction at this time according to the present invention.

The FIFO memory 72 receives the serial dot data of the original image from the P/S converter 71, and circularly transmits the dot data image into the sampling window 73.

Figure 5:
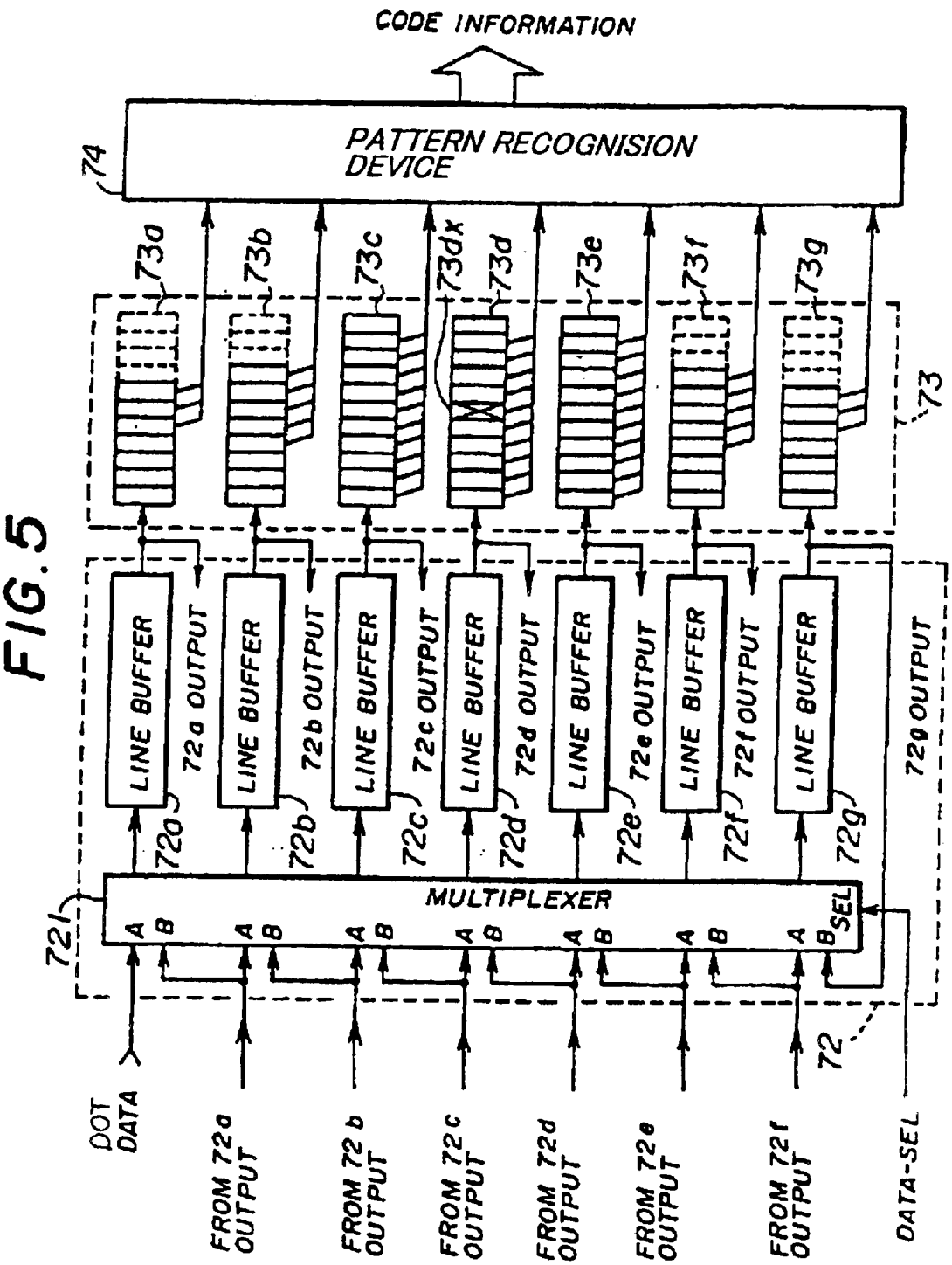
FIG. 5 is a block diagram illustrating a FIFO memory and a sampling window of the dot corrector of FIG. 4.

FIG. 5 is a block diagram illustrating the FIFO memory 72 and the sampling window 73 of the dot corrector of FIG. 4. With reference to FIG. 4 and FIG. 5, the FIFO memory 72 includes a multiplexer 721 and a plurality of line buffers 72a through 72g, which are connected to the output terminal of the P/S converter 71 via the multiplexer 721. In this example, seven line buffers 72a through 72g are provided in the FIFO memory 72, and therefore these seven line buffers 72a through 72g can store seven lines of dot data sent from the controller 3 at a time.

The multiplexer 721 provides a data select terminal denoted as DATA-SEL. When the DATA-SEL terminal receives value 0, the multiplexer 721 selects the input from terminal A, i.e., the serial dot data input sent from the controller 3 via the P/S converter 71 and the output data of the line buffers 72a through 72f, and transmits the selected inputs to the line buffers 72a through 72g to store therein. When the DATA-SEL terminal receives value 1, the multiplexer 721 selects the input from terminal B, i.e., the output data of the line buffers 72a through 72g, and transmits the selected inputs to the line buffers 72a through 72g to store therein again.

The data select signal DATA-SEL can be switched from value 0 to value 1 and from value 1 to value 0 plural times according to a dot multiplying value. When the data select signal DATA-SEL is switched plural times at appropriate timings, each of the line buffers 72a through 72g circulates dot data included in a main-scanning line, and circularly and repetitively outputs identical dot data to the sampling window 73. Further, when the line buffers 72a through 72g repetitively output identical dot data, the timing controller 77 counts the number of the repetitions, and outputs the count as information for an order of the repetitive output, such as count 0, count 1, count 2, and the count is denoted as A[13:12] as illustrated in FIG. 4. The count A[13:12] is structured by two bit data in binary notation and allocated in 13th and 12th binary digits of an address code input to the dot correction memory 75, which has a 16-bit code and denoted as A[15:0].

The sampling window 73 includes seven 11-bit shift registers 73a through 73g each serially connected to the corresponding line buffers 72a through 72g. In other words, the line buffers 72a through 72g function as the sampling window 73, and the sampling window 73 samples dots of the input dot data for outputting the sampled dots to the pattern recognition device 74.

A center bit, which is marked as X in FIG. 5, of the shift register 73d, stores a target dot, i.e., a dot to be multiplied at the moment. In the example, seven bits of the shift registers 73a and 73g, and eight bits of the shift registers 73b and 73f are used, and therefore the other bits of those shift registers illustrated by dotted lines in FIG. 5 may be omitted.

The stored data in the line buffers 72a through 72g of the FIFO memory 72 and the shift registers 73b and 73f of the sampling window 73 is shifted bit by bit. Consequently, the target dot and surrounding dots are renewed bit by bit, and thus the dot data of the target dot and the surrounding dots are extracted in succession according to the renewal of the target dot.

Figure 6:
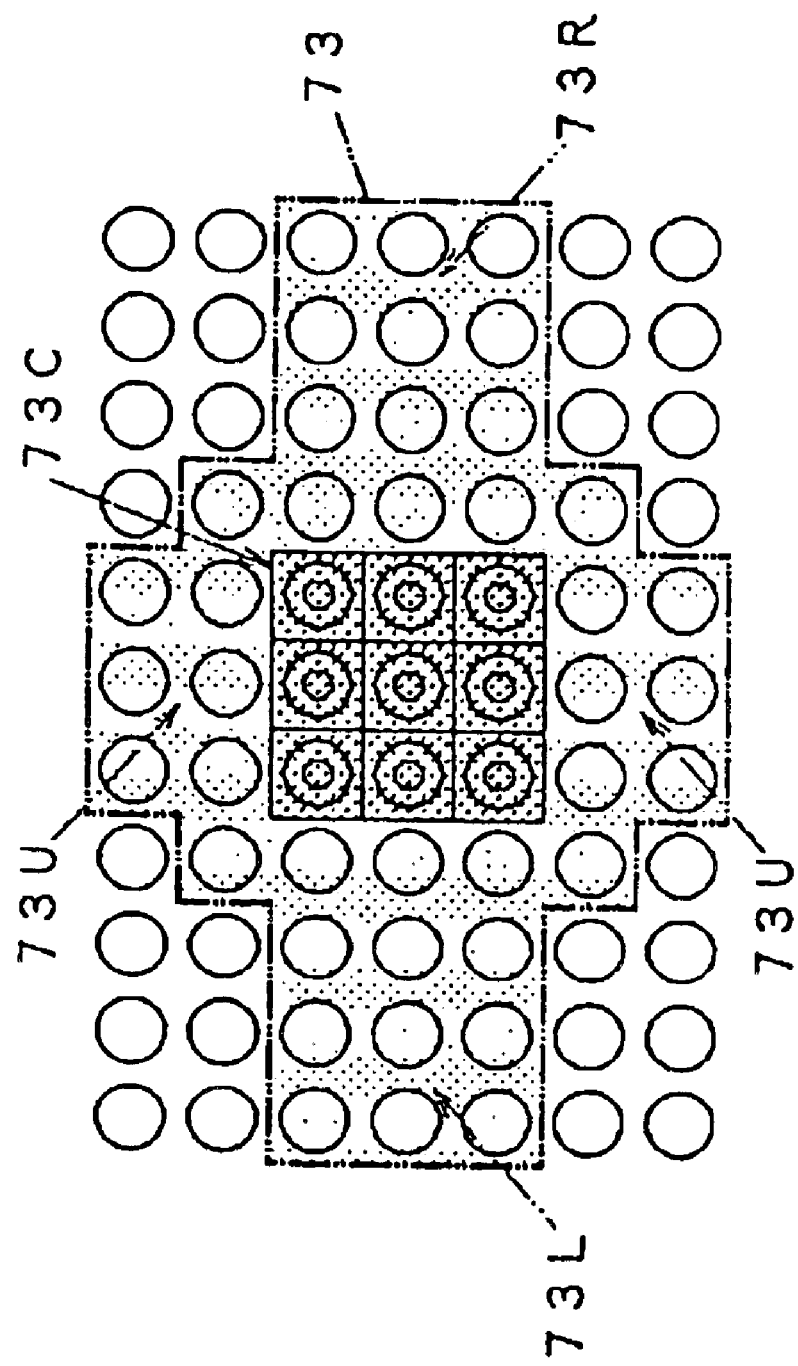
FIG. 6 is a diagram illustrating image data storing cells of shift registers, and each of which corresponds to a dot of the sampling window.

FIG. 6 is a diagram illustrating image data storing cells of the shift registers 73b and 73f, and each of which corresponds to a dot of the sampling window 73. Referring to FIG. 6, data storing cells are illustrated with circles, and the sampling window 73 is enclosed by the dotted lines. The sampling window 73 is divided into five different regions including a 3×3 dot core region 73C, which is enclosed by the solid lines and of which data storing cells are illustrated with double circles, an upper region 73U, a lower region 73D, a left region 73L, and a right region 73R.

Figure 7:
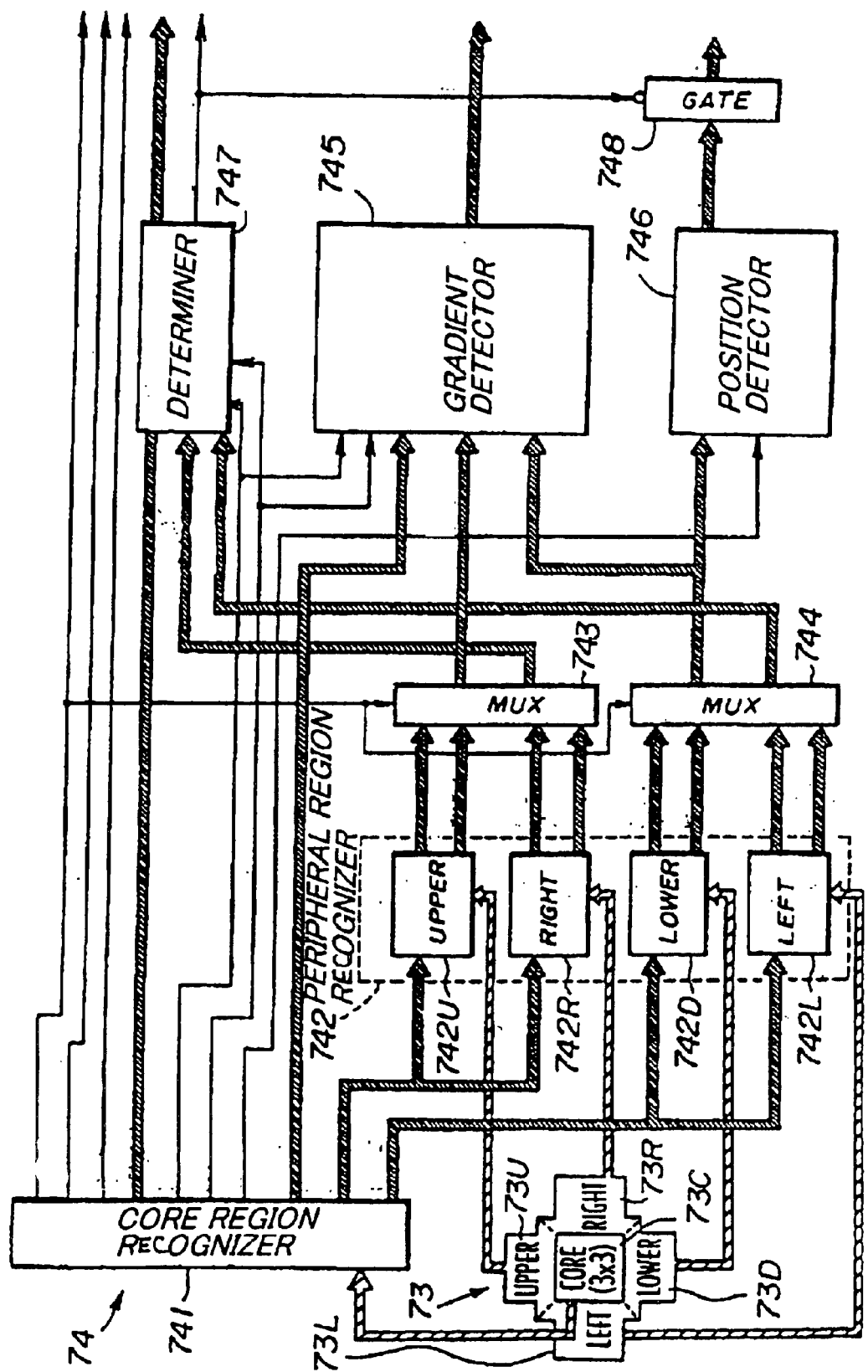
FIG. 7 is a block diagram illustrating a pattern recognition device of the dot corrector of FIG. 4.

FIG. 7 is a block diagram illustrating a pattern recognition device 74 of the dot corrector 7 of FIG. 4. The pattern recognition device 74 recognizes characteristics of a target dot and surrounding dots, specifically shapes of boundaries between a black dot region and a white dot region based on the dots extracted by the sampling window 73. According to the result of the recognition, the pattern recognition device 74 generates code information, which is denoted as A[11:0], in a predetermined format, and outputs the code information A[11:0] to the dot correction memory 75 as a part of the 16 bit-address code A[15:0] of the dot correction memory 75.

FIG. 7 also illustrates a relationship between the pattern recognition device 74 and the sampling window 73. Referring to FIG. 7, as described above, the sampling window 73 is divided into five different regions, including the 3×3 dot core region 73C, the upper region 73U, the lower region 73D, the left region 73L, and the right region 73R. The sampling window 73 is further described in detail in Japanese Laid Open Patent No. 5-207282 and Japanese Laid Open Patent No. 7-087321 and the disclosures of which are hereby incorporated herein by reference.

The pattern recognition device 74 includes a core region recognizer 741, a peripheral region recognizer 742, multiplexers MUX 743 and MUX 744, a gradient detector 745, a position detector 746, a determiner 747, and a gate 748. The peripheral region recognizer 742 includes an upper peripheral recognizer 742U, a right peripheral recognizer 742R, a lower peripheral recognizer 742D, and a left peripheral recognizer 742L. The pattern recognition device 74 is also described in detail in Japanese Laid Open Patent No. 5-207282 and Japanese Laid Open Patent No. 7-087321 and the disclosures of which are hereby incorporated herein by reference.

Referring back to FIG. 4, the dot correction memory 75 stores a plurality of 10-bit corrected dot information corresponding to the 16-bit addresses code A[15:0] of the dot correction memory 75. The 16 bit address code A[15:0] input to the dot correction memory 75 is structured by 12-bit code information A[11:0] output from the pattern recognition device 74, a 2-bit count A[13:12] for the repetitively sampled dot data in the sub-scan g direction Y, and a 2-bit count A[15:14] for the repetitively sampled dot data in the main-scanning direction X. Therefore, when the dot correction memory 75 is addressed by a 16 bit address code, the dot correction memory 75 can output one of the plural corrected dot information as corrected dot data or corrected video data to drive the laser diode unit 50 of FIG. 3.

When dots are newly generated by multiplying a target dot in an original image, either toward the sub-scanning direction Y or toward the main-scanning direction X, a value of the portion A[11:0] is not changed, because data of an identical target dot and surrounding dots thereof is repetitively input to the pattern recognition device 74, and therefore the pattern recognition device 74 outputs an identical recognition code A[11:0] to the dot correction memory 75. However, the portion A[13:12] and/or portion A[15:14] may be changed according to the count of the repetitive sampling of an identical target dot and surrounding dots, such as 0, 1, 2. That is, even when the 12-bit code information A[11:0] received from the pattern recognition device 74 is identical, the 16 bit address input to the dot correction memory 75 is changed, and thereby output corrected dot information can also be changed according to the values of the two kinds of 2-bit counts A[13:12] and A[15:14].

The dot correction memory 75 generates corrected dot information for every time when the input address code is input. That is, a plurality of dots are generated corresponding to each single target dot. In other words, each single target dot is multiplied. The corrected dot information is generated synchronous with the video clock signal WCLK. The values of the counts A[13:12] and A[15:14] are equal to an actually counted number minus one. Therefore, the number of the generated dot information, i.e., generated dots from a single target dot, becomes (A[13:12]+1)(A[15:14]+1). Thus, the original target dot is multiplied by A[13:12]+1 times toward the sub-scanning direction Y, and multiplied by A[15:14]+1 times toward the main-scanning direction X.

The corrected dot information output from the dot correction memory 75 includes information on the width and the phase of a generated dot in the main-scanning direction X. When the maximum width or the full width of a dot is divided by, for example, ten, the width of the generated dot may be expressed by a multiple of the divided value. For instance, the maximum width (full width) is expressed as a multiple 10, the half width is expressed as a multiple 5, the minimum width is expressed as a multiple 1, and a blank dot is expressed as a multiple 0. Similarly, the phase of a dot may be expressed, for example, by a phase angle of a dot regarding the video clock signal WCLK. The corrected dot information is transmitted to the video data output device 76 in a parallel data transmission manner.

The dot correction memory 75 may be structured by, e.g., a mask ROM, an EPROM, an EEPROM, a flash ROM, etc., and the corrected dot information may be stored at a production line of the laser printer 2. Further, when the dot correction memory 75 is a writable or rewritable memory, such as a flash ROM, the CPU 41 may selectively download the corrected dot information to the dot correction memory 75 from the ROM 32, the ROM 42, or the host computer 1. Thus, the corrected dot information may be easily replaced and upgraded as necessary.

Referring to FIG. 4, the video data output device 76 converts the corrected dot information into an on/off signal for driving the laser diode of the laser diode unit 50. As stated above, the dot correction memory 75 generates (A[13:12]+1)(A[15:14]+1) number of corrected dot information for each single target dot Therefore, the video data output device 76 converts those dot information into on/off signals which also generate A[13:12]+1 times dot of the original image toward the sub-scanning direction Y, and A[15:14]+1 times dot of the original image toward the main-scanning direction X on a paper to be output from the laser printer 2.

The laser diode unit 50 of FIG. 3 is periodically driven in synchronization with the video clock signal WCLK. The phase of a light emission can be shifted regarding the video clock signal WCLK according to an on/off signal of corrected dot information. The width of the light emission in the main-scanning direction X may also be varied for each dot according to the on/off signal generated based on the corrected dot information. In other words, the on/off signal output from the video data output device 76 specifies the phase and width of the dot according to the corrected dot information.

On the other hand, light quantity of the laser diode unit 50 is determined depending on a specified image resolution (i.e., DPIout) in the sub-scanning direction Y. The height of a dot in the sub-scanning direction Y increases with increasing light quantity of the laser diode unit 50. When the image resolution DPIout decreases, the height of a dot increases. In this example, the light quantity of the laser diode unit 50 is controlled by multi-value data. Therefore, the controller 3 determines the multi-value data depending on the output image resolution data DPIout, and sets the determined multi-value data to the optical writing module 26 of the printer engine 5 via the engine driver 4 and the internal interface (I/F) 6. In other words, the controller 3 sets the height of a dot in the sub-scanning direction Y to the optical writing module 26 by specifying the multi-value data.

Referring to FIG. 4, the timing controller 77 receives an FGATE signal, an LGATE signal, an LSYNC signal, the video clock signal WCLK, and a reset signal all from the engine driver 4. The FGATE signal prescribes a range of page video data, and the LGATE signal prescribes a span of a main-scanning line of the video data. The LSYNC signal prescribes a start timing of the main-scanning line of the video data. The video clock signal WCLK is provided for synchronization of reading and writing operations for each dot. For example, the video clock signal WCLK is utilized for driving the laser diode unit 50 for every dot. Further, the timing controller 77 generates clock signals for synchronizing operations of the parallel-to-serial converter (P/S) 71, the first-in first-out (FIFO) memory 72, the sampling window 73, the pattern recognition device 74, the dot correction memory 75, and the video data output device 76.

The dot corrector 7 also includes a register array 78 for setting numbers of circularity sampling dot data at the FIFO memory 72. The register array 78 includes a DPIinY register, a DPIoutY register, a Dy register, an Ry register, a DPIinX register, a DPIoutX register, a Dx register, and an Rx register. The DPIinY register stores an input image resolution or original image resolution DPIinY in the sub-scanning direction Y, and the DPIinX register stores an input image resolution DPIinX in the main-scanning direction X. The DPIoutY register stores an output image resolution DPIoutY in the sub-scanning direction Y, and the DPIoutX register stores an output image resolution DPIoutX in the main-scanning direction X.

The Dy register and the Ry register store positive integers Dy and Ry, respectively. The positive integers Dy and Ry indicate numbers of circularity and repetitive sampling of data of identical dots in the sub-scanning direction Y for odd and even lines, i.e., main-scanning lines, respectively. When dot data of identical lines is circularly and repetitively sampled by the sampling window 73, as stated above, the dot recognition memory 75 repetitively generates corrected dot information plural times, which is specified by the integers Dy and Ry. Therefore, the video data output device 76 repetitively receives those information and outputs video data plural times for a single target dot for generating plural dots.

The Dx register and the Rx register store positive integers Dx and Rx, respectively. The positive integers Dx and Rx indicate repetitive sampling numbers of data of dots in odd order and dots in even order on a main-scanning line in the main-scanning direction X, respectively.

When the positive integers Dy, Ry, Dx and Rx are set in the register array 78, the FIFO memory 72 repetitively outputs identical dot data, i.e., identical bit mapped image data, to the sampling window 73 of which a repeating cycle is specified by the positive integers Dy, Ry, Dx and Rx. Thus, each single target dot, i.e., each dot in the original image, is multiplied by Dy or Ry times in the sub-scanning direction Y, and by Dx or Rx times in the main-scanning direction X.

When an image resolution is converted into a higher image resolution by alternatively multiplying each dot in an original image by the positive integers Dy and Ry in the sub-scanning direction Y, and by the positive integers Dx and Rx in the main-scanning direction X, the number of dots per unit length is proportional to the image resolution. Therefore, the following relationships hold.

$$(Dy+Ry)/2 = DPIoutY/DPIinY \quad (1)$$

$$(Dx+Rx)/2 = DPIoutX/DPIinX \quad (2)$$

When Dy equals to Ry, and Dx equals to Rx, the above relations are simplified as follows.

$$Dy = Ry = DPIoutY/DPIinY \quad (3)$$

$$Dx = Rx = DPIoutX/DPIinX \quad (4)$$

Accordingly, when the controller 3 receives an original image resolution DPIinY and an output image resolution DPIoutY in the sub-scanning direction Y of which quotient is an integer, i.e., the fraction part of the quotient is zero, the controller 3 stores the quotient to the Dy and Ry registers in the register array 78. Likewise, when the controller 3 receives an original image resolution DPIinX and an output image resolution DPIoutX in the main-scanning direction X of which quotient is an integer, the controller 3 sets the quotient to the Dx and Rx registers in the register array 78.

As an example, when the controller 3 receives 400 dpi as DPIinY and DPIinX, and 1200 dpi as DPIoutY and DPIoutX, the controller 3 determines an integer value 3 (=1200/400) for Dy and an integer value 3 (=1200/400) for Dx. Then, the controller 3 stores these positive integers 3 in the Dy, Ry, Dx and Rx registers of the register array 78, respectively.

When a quotient of an output image resolution divided by an original image resolution is not an integer, i.e., the fraction part of the quotient is not zero, the controller 3 receives further information from the host computer 1.

In the present invention, absolute magnification ratios Ry0 for the sub-scanning direction Y and Rx0 for the main-scanning direction X are used. Each of the absolute magnification ratios Ry0 and Rx0 is defined as a ratio of the number of dots of a converted or multiplied image to the number of dots of an original image for a respective scanning direction. Target dots of an original image are alternatively multiplied by Dy and Ry in the sub-scanning direction Y, and alternatively multiplied by Dx and Rx in the main-scanning direction X. Therefore, the absolute magnification ratios Ry0 and Rx0 are defined as follows.

$$Ry0 = (Dy+Ry)/2 \quad (5)$$

$$Rx0 = (Dx+Rx)/2 \quad (6)$$

When Ry is equal to Dy, the absolute magnification ratio Ry0 is equal to Dy and Ry, and when Rx is equal to Dx, the absolute magnification ratio Rx0 is equal to Dx and Rx. As another example, when Dy is 3 and Ry is 2, then the absolute magnification ratio Ry0 is $5/2$ (=2.5), likewise, Dx is 3 and Rx is 4, then the absolute magnification ratio Rx0 is $7/2$ (=3.5).

When Dy is 3 and Ry is 4, then the absolute magnification ratio Ry0 is $7/2$ (=3.5), and when Dx is 5 and Rx is 4, the absolute magnification ratio Rx0 is $9/2$ (=4.5). Further, when Dy and Rx are 18 and Dy and Dx are 17, then the absolute magnification ratios Ry0 and Rx0 becomes $35/2$ (=17.5).

Further, in the present invention, relative magnification ratios Ryi for the sub-scanning direction Y and Rxi for the main-scanning direction X are used. The relative magnification ratio Ryi is defined as a ratio of the number of dots of a converted image by using different values of Dy and Ry to the number of dots of a converted image by using the same values of Dy and Ry. Likewise, the relative magnification ratio Rxi is defined as a ratio of the number of dots of a converted image by using different values of Dx and Rx to the number of dots of a converted image by using the same values of Dx and Rx. Therefore, the relative magnification ratios Ryi and Rxi are described as follows.

$$Ryi = (Dy+Ry)/2Dy \quad (7)$$

$$Rxi = (Dx+Rx)/2Dx \quad (8)$$

For example, when Ry is equal to Dy, the relative magnification ratio Ryi is one, and when Rx equal is equal to Dx, the relative magnification ratio Rxi is also one. As another example, when Dy is 3 and Ry is 2, then the relative magnification ratio Ryi is $5/6$ (=0.833), likewise, Dx is 3 and Rx is 4, then the relative magnification ratio Rxi is $7/6$ (=1.1667). Further, when Dy and Dx are 18, and Ry and Rx are 17, then the relative magnification ratios Ryi and Rxi become 35/36 (=0.9722).

When a quotient of an output image resolution divided by an original image resolution is not an integer, i.e., the fraction part of the quotient is not zero, the controller 3 further receives values of the absolute magnification ratios Ry0 and Rx0 and/or values of the relative magnification ratios Ryi and Rxi from the host computer 1. When the controller 3 receives that information, the controller 3 determines the positive integers Dy and Ry and the positive integers Dx and Rx corresponding to the received information by using the above described relations (1), (2), (5) and (6), or (1), (2), (7) and (8). Then, the controller 3 stores the determined positive integers in the Dy, Ry, Dx, and Dx registers of the register array 78.

Referring to FIG. 4, the timing controller 77 receives the original image resolutions DPIinY and DPIinX, the output image resolutions DPIoutY and DPIoutX, and integers Dy, Ry, Dx and Rx from the register array 78 in addition to receiving the signals from the engine driver 4. According to the received data and signals, the timing controller 77 generates control signals for forming an image that satisfies the output image resolutions DPIoutY and DPIoutX, and the relative magnification ratios Ryi and Rxi.

FIGS. 8A, 8B, 8C, 8D, 8E, 8F, 8G, 8H, 8I, and 8J are timing diagrams illustrating a transition of output data from the line buffers 72a through 72g to the sampling window 73 at an exemplary state of circulatory output operations. In this example, the positive integers Dy is set with three, and Ry is set with three. More specifically, FIG. 8A illustrates dot data input to the multiplexer 721. FIG. 8B illustrates the data select signal DATA-SEL input to the multiplexer 721 of FIG. 5. FIGS. 8C to 8I illustrate outputs of the line buffers 72a to 72g, respectively, and FIG. 8J illustrates the count A[13:12] of repetitive output of identical data or each single target dot.

In FIGS. 8A and 8C through 8I, each of the numerals 1, 2, 3, 4, etc., represents a line number of a main-scanning line sent from the controller 3. For example, the numeral 1 represents dot data included in the first main-scanning line; the numeral 2 represents dot data included in the second main-scanning line, and so forth.

The data select signal DATA-SEL can be switched from value 0 to 1 and from value 1 to 0 at appropriate timings corresponding to the dot multiplying values Dy and Ry. When the data select signal DATA-SEL is switched plural times at appropriate timings, each of the line buffers 72a to 72g circulates dot data included in a main-scanning line, respectively, and circularly and repetitively outputs the identical dot data to the sampling window 73. Further, when the line buffers 72a to 72g repetitively output identical dot data plural times to the sampling window 73, the timing controller 77 outputs a count A[13:12] of the repetitive outputs as information for an order of the repetitive outputs, as illustrated in FIG. 8J. When, the 2-bit count A[13:12] reaches Ry (i.e., 3) and Dy (i.e., 3), the count is reset and initialized to zero. Thus, the 2-bit count A[13:12] repeats counting of 0, 1, 2, 0, 1, 2, 0, 1, 2, and so on.

In this example, dot data in a main-scanning line is circularly and repetitively written in the same line buffer of the FIFO memory 72 for Ry (i.e., 3) times and Dy (i.e., 3) times, and is repetitively output to the sampling window 73. The circularly and repetitively written data for odd main-scanning lines is grouped as a first group of the first positive integer Dy, such as three lines of the first group. Likewise, circularly and repetitively written data for even main-scanning lines is grouped as a second group of the second positive integer Ry, such as three lines of the second group. The two grouping operations are alternately repeated one after the other for the main-scanning line, and the first positive integer Dy is assigned for odd lines and the second positive integer Ry is assigned for even lines. However, the odd lines and the even lines may be exchanged, i.e., the first positive integer Dy may be assigned for the even lines and the second positive integer Ry may be assigned for the odd lines.

For performing the circularity and repetitive writing operation to the FIFO memory 72, the timing controller 77 initially controls the data select signal DATA-SEL to have a value 0 such that a data write signal is asserted and thereby the dot data is written in the FIFO memory 72. After that, the timing controller 77 controls the data select signal DATA-SEL to have a value 1 and value 0 alternatively so that a data write signal a data read signal are alternately asserted and negated. Thereby, the dot data in a line is circularly and repetitively written in the FIFO memory 72 and is also repetitively read out from the FIFO memory 72 and transmitted to the sampling window 73.

Therefore, the FIFO memory 72 repetitively outputs circularity stored dot data of each of the odd lines for Dy (i.e., 3) times and each of the even lines for Ry (i.e., 3) times to the sampling window 73. In other words, the FIFO memory 72 alternatively outputs the identical dot data to the sampling window 73 in a 1/Dy (⅓) cycle and 1/Ry (⅓) cycle of the original image input cycle. Thereby, the sampling window 73 repetitively samples the same input dot data, and transmits the sampled data to the pattern recognition device 74.

When the pattern recognition device 74 repetitively receives the identical dot data, the pattern recognition device 74 repetitively outputs identical code information A[11:0] to the dot correction memory 75. The dot correction memory 75 also receives the 2-bit count A[13:12], which varies three times (i.e., Ry times and Dy times), and A[15:14] while the code information A[11:0] does not vary. Therefore, the dot correction memory 75 can output different corrected dot information according to the value of the 2-bit count A[13:12] to the video data output device 76. In addition, the dot correction memory 75 can also output identical corrected dot information regardless of the value of the 2-bit count A[13:12] as necessary.

Generally, for diagonal lines or diagonal boundaries of a white dots region and a black dots region and vicinities thereof, the dot correction memory 75 outputs different corrected dot information according to the value of the 2-bit count A[13:12] to the video data output device 76 for correcting jagged images. However, for regions other than the above-described region, the dot correction memory 75 may output identical corrected dot information.

The video data output device 76 converts the identical or different corrected dot information into on/off signals to drive the laser diode unit 50. According to the on/off signals, the laser printer 2 can form an image having three times the quantity of dots in the sub-scanning direction Y on a paper. Thus, an image is converted of which resolution in the sub-scanning direction Y is formed on the paper.

FIG. 9 is a diagram illustrating a relationship between an original image indexed by line numbers thereof and a circulatory output image indexed by line numbers and repetitive output numbers thereof when each line of the original image data is circularly output from the FIFO memory 72 as multiplied three lines of the original image according to the circulatory output operations illustrated in FIGS. 8A to 8J. Referring to FIG. 9, the left side drawing illustrates the original image, and the line numbers are illustrated on the left thereof. The upper right drawing illustrates an image firstly output from the FIFO memory 72, and the line numbers of the original image and output order 1 of the repetitive output tied by a hyphen are illustrated on the left side of the drawing. The middle right drawing illustrates an image secondly output from the FIFO memory 72, and the line numbers of the original image and output order 2 of the repetitive output. The lower right drawing illustrates an image thirdly output from the FIFO memory 72, and the line numbers of the original image and output order 3 of the repetitive output.

Figure 10B:
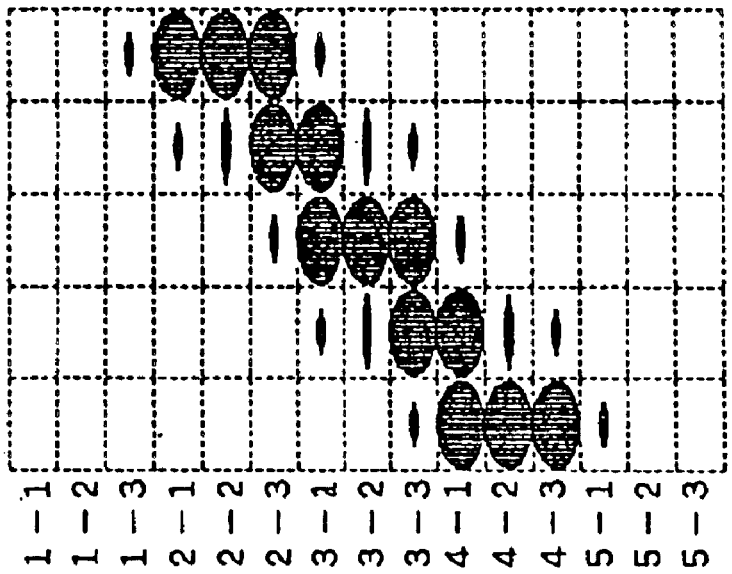
FIG. 10B is a diagram illustrating an image formed by multiplying each original single line into three lines in the sub-scanning direction Y and with a jagged image correcting operation indexed by line numbers and repetitive output numbers thereof according to the circulatory outputting operations illustrated in FIGS. 8A to 8J.
Figure 10A:
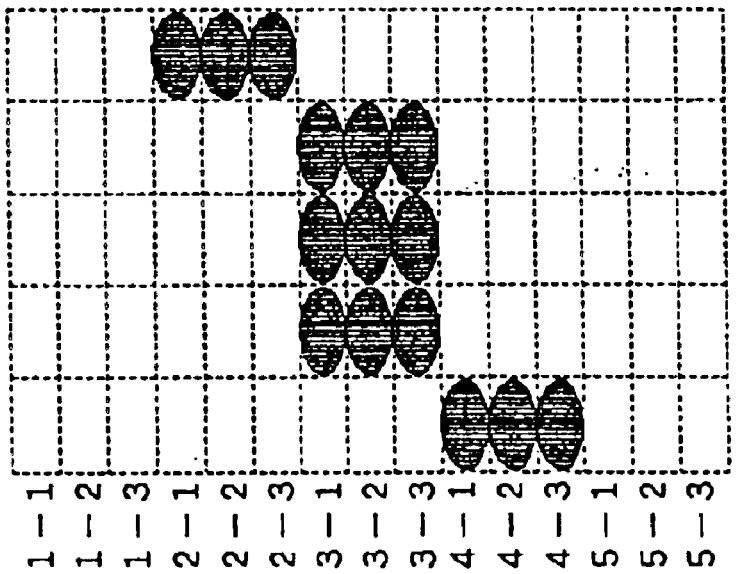
FIG. 10A is a diagram illustrating an image formed by multiplying each original single line into three lines in the sub-scanning direction Y indexed by line numbers and repetitive output numbers thereof according to the circulatory outputting operations illustrated in FIGS. 8A to 8J.

FIG. 10A is a diagram illustrating an image formed by multiplying each original single line into three lines in the sub-scanning direction Y indexed by line numbers and repetitive output numbers thereof according to the circulatory outputting operations illustrated in FIGS. 8A to 8J. In this example, when the correction memory 75 receives the code information A[11:0] and the 2-bit counts A[13:12] and A[15:14], the correction memory 75 generates identical corrected dot information to the video data output device 76 regardless of the 2-bit count A[13:12]. Thus, the image simply multiplied by three in the sub-scanning direction Y is obtained.

FIG. 10B is a diagram illustrating an image formed by multiplying each original single line into three lines in the sub-scanning direction Y and in which a jagged image correcting operation is executed, indexed by line numbers and repetitive output numbers thereof according to the circulatory output operations illustrated in FIGS. 8A to 8J. In FIG. 10B, large dots represent dots that are not corrected, and small dots represent dots corrected by the jagged image correcting operation. In this example, when the correction memory 75 receives the code information A[11:0] and the 2-bit counts A[13:12] and A[15:14], the correction memory 75 generates different corrected dot information to the video data output device 76 depending on the 2-bit counts A[13:12]. Thus, the image multiplied by three in the sub-scanning direction Y and of which dots are corrected is obtained. As illustrated, the jagged diagonal line is corrected into a relatively smooth diagonal line.

FIGS. 11A, 11B, 11C, 11D, 11E, 11F, 11G, 11H, 11I, and 11J are timing diagrams illustrating a transition of output data from the line buffers 72a through 72g to the sampling window 73 at another exemplary state of circulatory output operations. In this example, the positive integers Dy is set with three, and Ry is set with two in the register array 78. More specifically, FIG. 11A illustrates the dot data input to the multiplexer 721. FIG. 11B illustrates the data select signal DATA-SEL input to the multiplexer 721 of FIG. 5. FIGS. 11C to 11I illustrate outputs of the line buffers 72a through 72g to the sampling window 73, respectively, and FIG. 11J illustrates the count A[13:12] of repetitive output of identical dot data included in a single main-scanning line.

In FIGS. 11A and 11C through 11I, each of the numerals 1, 2, 3, 4, etc., represents a line number of a main-scanning line sent from the controller 3. For example, the numeral 1 represents dot data included in the first main-scanning line; the numeral 2 represents dot data included in the second main-scanning line, and so on.

In this example, identical dot data in a main-scanning line is circularly and repetitively written in the same line buffer of the FIFO memory 72 for Ry times (i.e., 3 times) and Dy (i.e., 2 times) times, and is repetitively output to the sampling window 73. As stated above, the circularly and repetitively written data for odd main-scanning lines is grouped in a first group of the first positive integer Dy. Likewise, circularly and repetitively written data for even main-scanning lines is grouped in a second group of the second positive integer Ry. The two grouping operations are also alternately repeated one after the other, and the first positive integer Dy is assigned for odd scanning lines and the second positive integer Ry is assigned for even scanning lines in this example.

Therefore, the FIFO memory 72 repetitively outputs the circularity stored dot data in each odd line for Dy (i.e., 3) times, and each even line for Ry (i.e., 2) times to the sampling window 73. In other words, the FIFO memory 72 alternatively outputs the dot data to the sampling window 73 in a 1/Dy (⅓) cycle and 1/Ry (½) cycle of the original image input cycle.

When the sampling window 73 repetitively samples the dot data, the pattern recognition device 74 repetitively generates and transmits identical code information A[11:0] to the dot correction memory 75. In addition to the code information A[11:0], the dot correction memory 75 receives the 2-bit counts A[15:14] and A[13:12] that vary three times (Ry times) and two times (Dy times) alternatively. Therefore, the dot correction memory 75 can output either identical or different corrected dot information to the video data output device 76, and the video data output device 76 converts the received corrected dot information into on/off signals. Thus, each of the odd main-scanning lines of the original image is multiplied by 3 times (Ry times) and each of the even main-scanning lines of the original image is multiplied by 2 times (Dy times). Thus, the laser printer 2 can form an image having 2.5 times dots in the sub-scanning direction Y on a paper compared to the original image.

Figure 12:
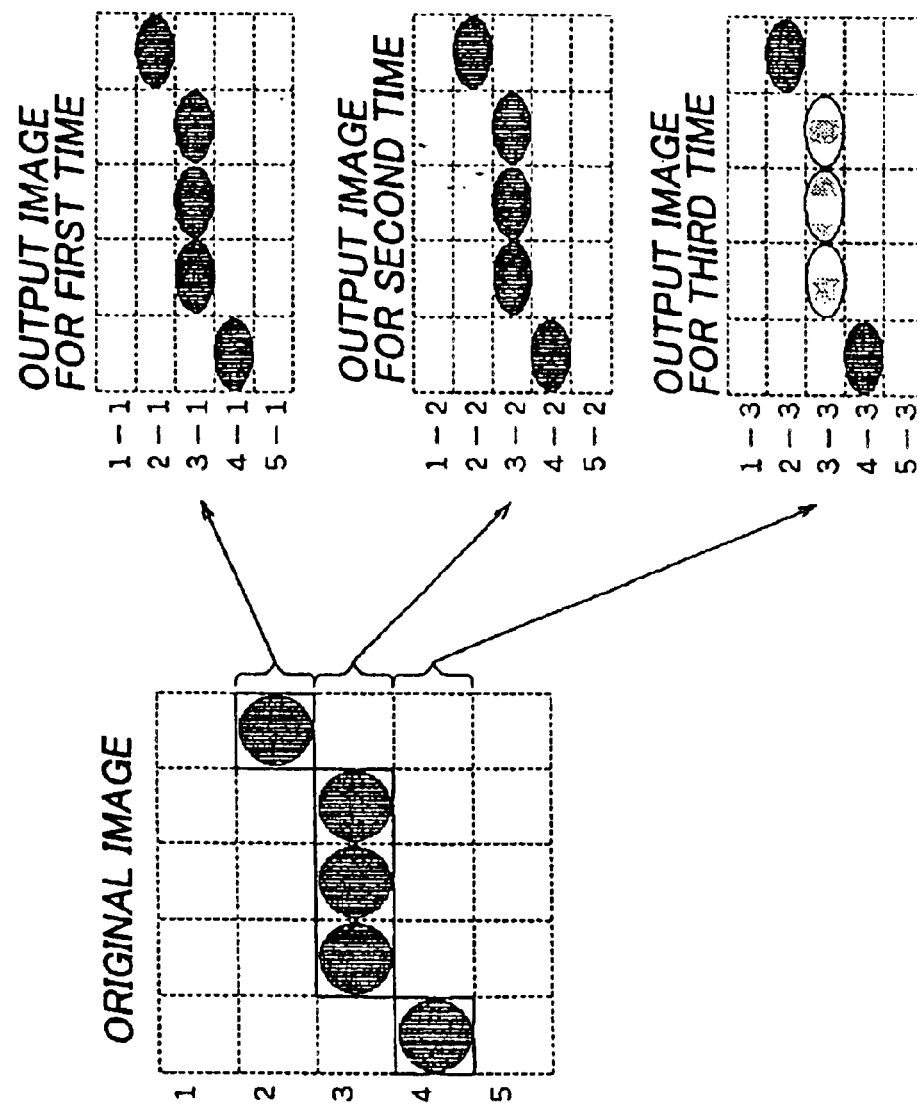
FIG. 12 is a diagram illustrating a relationship between an original image data indexed by a line number and circulatory output image data indexed by line numbers and repetitive output numbers thereof when each line of the original image data is circularly output from the FIFO memory as multiplied three lines of the image data according to the circulatory outputting operations illustrated in FIGS. 11A to 11J.

FIG. 12 is a diagram illustrating a relationship between an original image indexed by line numbers and a circulatory output image indexed by line numbers and repetitive output numbers thereof when each line of the original image data is circularly output from the FIFO memory 72 as multiplied three lines of odd lines and two lines of even lines of the original image according to the circulatory output operations illustrated in FIGS. 11A to 11J.

In FIG. 12, the left side drawing illustrates the original image and line numbers illustrated on the left thereof. The upper right drawing illustrates an image firstly output from the FIFO memory 72, and line numbers of the original image and output order 1 of the repetitive output tied by a hyphen are denoted on the left side of the drawing. The middle right drawing illustrates an image secondly output from the FIFO memory 72, and line numbers of the original image and output order 2 of the repetitive output. The lower right drawing illustrates an image thirdly output from the FIFO memory 72, and line numbers of the original image and output order 3 of the repetitive output. In the lower right drawing, black dots are illustrated as output dots, however white dots are not output from the FIFO memory 72 but are illustrated for reference.

Figure 13B:
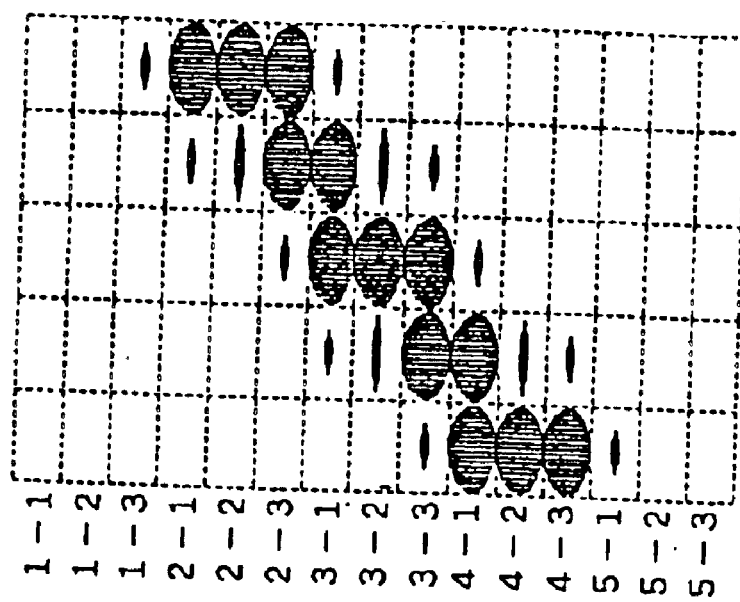
FIG. 13B is a diagram illustrating an image formed by multiplying each original single line into three lines for odd lines and into two lines for even lines in the sub-scanning direction Y with a jagged image correcting operation indexed by line numbers and repetitive output numbers thereof according to the circulatory outputting operations illustrated in FIGS. 11A to 11J.
Figure 13A:
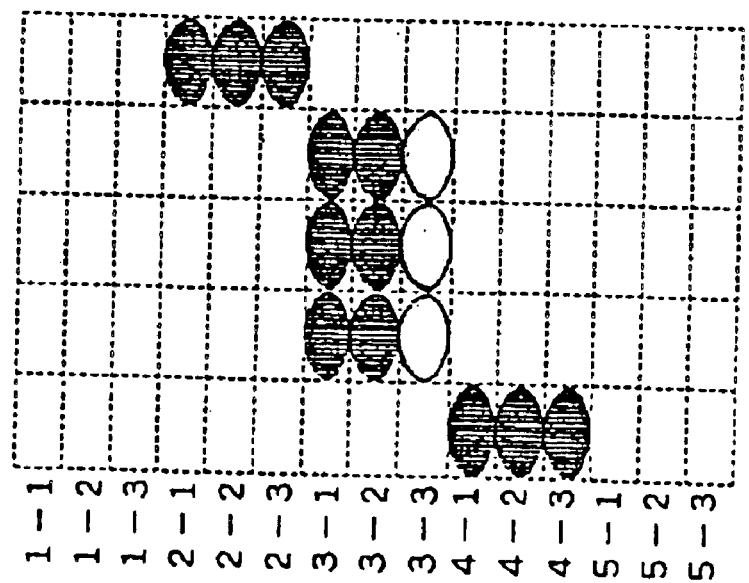
FIG. 13A is a diagram illustrating an image formed by multiplying each original single line into three lines for odd lines and into two lines for even lines in the sub-scanning direction Y indexed by line numbers and repetitive output numbers thereof according to the circulatory outputting operations illustrated in FIGS. 11A to 11J.

FIG. 13A is a diagram illustrating an image formed by multiplying each odd original single line into three lines and multiplying each even original single line into two lines in the sub-scanning direction Y indexed by line numbers and repetitive output numbers thereof according to the circulatory output operations illustrated in FIGS. 11A to 11J. In this example, when the correction memory 75 receives the code information A[11:0] and the 2-bit counts A[13:12] and A[15:14], the correction memory 75 generates identical corrected dot information to the video data output device 76 regardless of the 2-bit count A[13:12]. Thus, the output image that is simply multiplied by three for original odd lines and multiplied by two for original even lines in the sub-scanning direction Y is obtained.

FIG. 13B is a diagram illustrating an image formed by multiplying each original single line into three lines for odd lines and two lines for even lines in the sub-scanning direction Y with a jagged image correcting operation indexed by line numbers and repetitive output numbers thereof according to the circulatory output operations illustrated in FIGS. 11A to 11J.

In FIG. 13B, large dots represent dots that are not corrected, and small dots represent dots corrected by the jagged image correcting operation. In this example, when the correction memory 75 receives the code information A[11:0] and the 2-bit counts A[13:12] and A[15:14], the correction memory 75 generates different corrected dot information to the video data output device 76 depending on the 2-bit counts A[13:12]. Thus, the image multiplied by three in the sub-scanning direction Y of which dots are corrected is obtained. Thus, the jagged diagonal line is corrected into a relatively smooth diagonal line as illustrated. In addition, the image preserves features of the original image. Further, the output relative magnification ratios Ryi in the sub-scanning direction Y and Rxi in the main-scanning direction X are determined by a combination of Dy and Ry, and a combination of Dx and Rx, respectively.

In the above described example, Dy is 3 and Ry is 2, then the absolute magnification ratio Ry0 is 2.5 (i.e., (Dx+Rx)/2), and the relative magnification ratio Ryi is ⅚ (i.e., (Dy+Ry)/2Dy). Likewise, the absolute magnification ratio Rx0 is 2.5 and the relative magnification ratio Rxi is ⅚. As an example, when an A4 size original image in 400 dpi resolution is printed on an A4 size paper in 1200 dpi resolution, both Dy and Ry may be set with three. However, when the same original image is printed on a letter size paper, which is a little shorter than A4, the integer Dy may be set with 3 and Ry may be set with 2. Thus, printed image is reduced to ⅚ compared to the former setting and the whole image can be printed on the letter size paper without exceeding the size of the paper.

The positive integers Dy and Ry are set with positive integer values which are equal to or larger than 1, i.e., a natural number. When Ry is greater than Dy, the relative magnification ratio Ryi becomes greater than 1, and when Ry is smaller than Dy, the relative magnification ratio Ryi becomes smaller than 1. For purposes of reference, when Ry is zero, Ryi becomes infinite, and setting Ry with zero is not practical in this apparatus.

Figure 14:
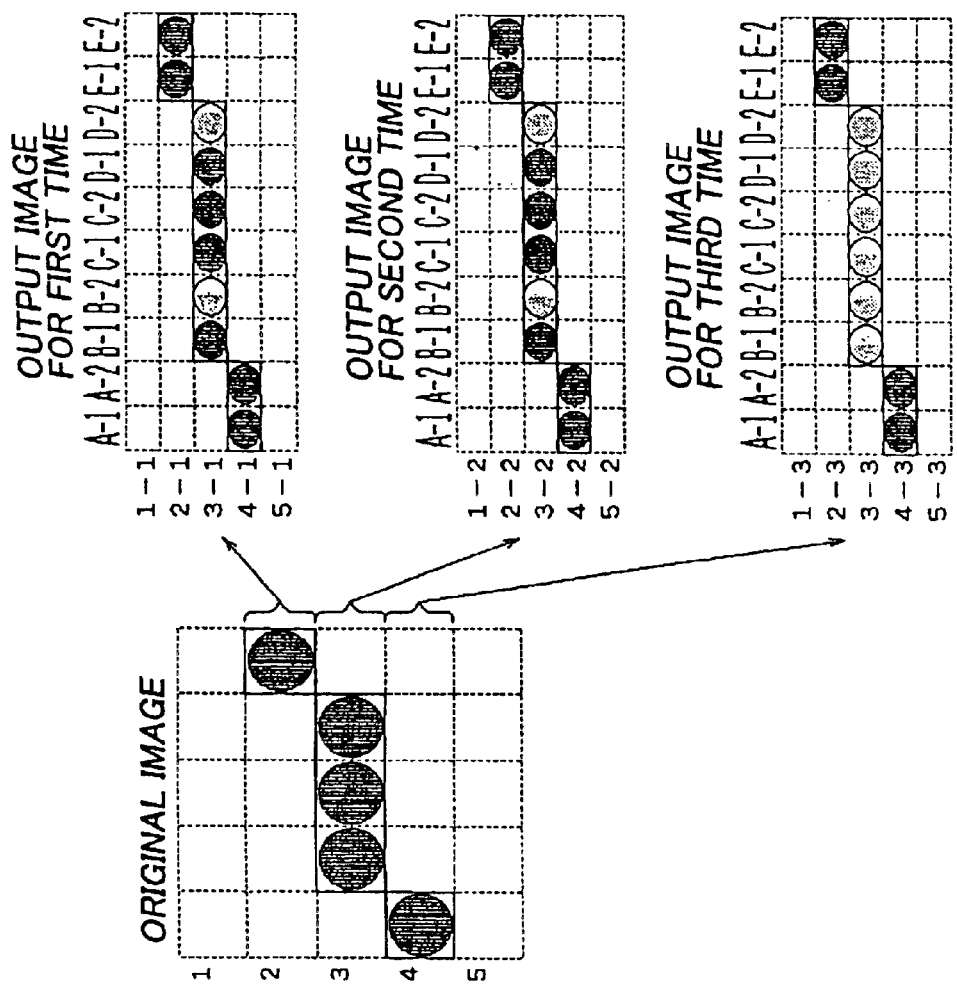
FIG. 14 is a diagram illustrating a relationship between an original image indexed by line numbers and multiplied image in both of the sub-scanning direction Y and the main scanning direction X indexed by line numbers and dot symbols of the original image data according to the circulatory outputting operations illustrated in FIGS. 11A to 11J.

FIG. 14 is a diagram illustrating a relationship between an original image indexed by line numbers and a multiplied image in both of the sub-scanning direction Y and the main scanning direction X indexed by line numbers and dot symbols of the original image data which is output from the FIFO memory 72 according to the circulatory output operations illustrated in FIGS. 11A to 11J.

In FIG. 14, the left side drawing illustrates an original image, and corresponding line numbers are denoted on the left thereof. The upper right drawing illustrates an image firstly output from the FIFO memory 72 with line numbers of the original image and output order 1 of the repetitive output tied by a hyphen are denoted on the left side of the drawing, and symbols such as A, B, C, D, E, and output order of the repetitive output toward the main-scanning direction X tied by a hyphen on the upper side of the drawing. The middle right drawing illustrates an image secondly output from the FIFO memory 72, line numbers of the original image and output order 2 of the repetitive output and the symbols. The lower right drawing illustrates an image thirdly output from the FIFO memory 72, line numbers of the original image and output order 3 of the repetitive output the symbols. In FIG. 14, black dots are illustrated as output dots, however white dots are not output but are illustrated for reference. Symbols A, C and E represent odd-numbered dots, and symbols B and D represent even-numbered dots in the main-scanning direction X.

In this case, as the repetitive image multiplying cycle Dy, a value 3 is stored in the Dy register of the register array 78, and as the repetitive image multiplying cycle Ry, a value 2 is stored in the Ry register of the register array 78. Further, as the repetitive image multiplying cycle Dx, a value 2 is stored in the Rx register of the register array 78, and as the repetitive image multiplying cycle Rx, a value 1 is stored in the Rx register of the register array 78.

Referring FIG. 14, identical dot data in a main-scanning line is circularly and repetitively written in the same line buffer of the FIFO memory 72 for Ry times (i.e., 3 times) and Dy (i.e., 2 times) times, and is repetitively output to the sampling window 73. Further, each odd-numbered dot in the main-scanning direction X of the original image is continuously and is repetitively output Rx times (i.e., 2 times), and each even-numbered dot is output Dx times (i.e., 1 time) from the FIFO memory 72 during the operations illustrated in FIGS. 11A to 11J. The continuously and repetitively output dots toward the main-scanning direction X, i.e., multiplied dots, are output in synchronization with the video clock signal WCLK one after the other.

Regarding an odd dot in a line of the original image data, the FIFO memory 72 continuously and repetitively outputs two times in two periods of the video clock signal WCLK. Therefore, the sampling window 73 repetitively samples the identical input data twice, and transmits the identical sampled data to the pattern recognition device 74 twice. Consequently, the pattern recognition device 74 generates identical code information A[11:0] twice, and sends the identical code information A[11:0] as a part of address code A[15:0] to the dot correction memory 75 twice.

Meanwhile, the timing controller 77 counts the video clock signal WCLK during the continuous and repetitive data sampling by the sampling window 73, i.e., during the repetitive output of the identical data, and outputs the count A[15:14] as a portion of address code A[15:0] to the dot correction memory 75.

As an address data input to the dot correction memory 75 for a single odd target dot, the code information A[11:0] output twice from the pattern recognition device 74 does not change, however at least the 2-bit count A[15:13] varies such that count 0, count 1 while the single odd target is continuously and repetitively sampled. Thus, the dot correction memory 75 can output two different corrected dots for the single target dot.

Figure 15B:
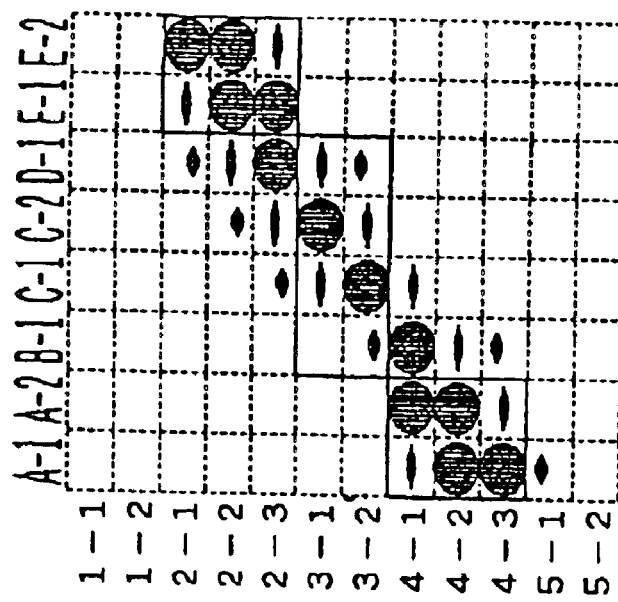
FIG. 15B is a diagram illustrating an image formed by multiplying each odd line into three lines and multiplying each even line into two lines in the sub-scanning direction Y, and multiplying each odd-numbered dot into two dots and multiplying each odd-numbered dot into one dot in the main-scanning direction X with jagged image correcting operation.
Figure 15A:
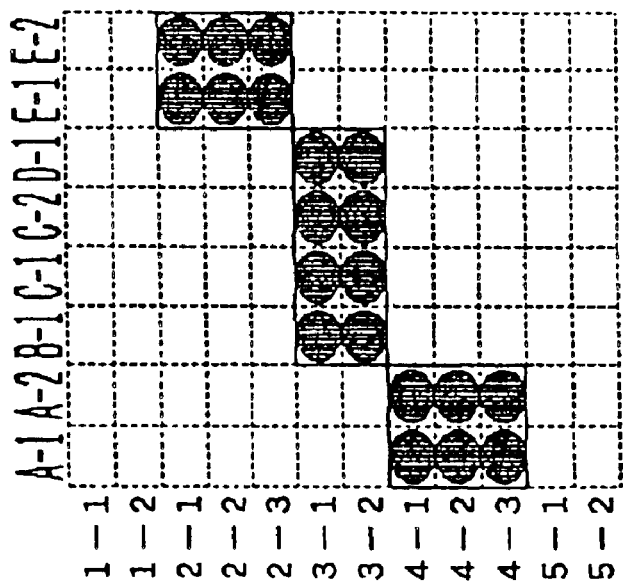
FIG. 15A is a diagram illustrating an image formed by multiplying each odd line into three lines and multiplying each even line into two lines in the sub-scanning direction Y, and multiplying each odd-numbered dot into two dots and multiplying each odd-numbered dot into one dot in the main-scanning direction X.

FIG. 15A is a diagram illustrating an image formed by multiplying each odd line into three lines and multiplying each even line into two lines in the sub-scanning direction Y, and multiplying each odd-numbered dot into two dots and multiplying each even-numbered dot into one dot in the main-scanning direction X. FIG. 15A also indicates line numbers and repetitive output numbers thereof and dot identifiers, such as A, B, C, and repetitive output numbers thereof. In this example, when the correction memory 75 receives the code information A[11:0] and the 2-bit counts A[13:12] and A[15:14], despite the 2-bit counts A[13:12] and/or A[15:14] varying, the correction memory 75 generates and outputs identical corrected dot information to the video data output device 76. Thus, for the image simply multiplied by three for odd lines and two for even lines in the sub-scanning direction Y, odd numbered dots are doubled and even numbered dots are output without being multiplied can be obtained. Therefore, the absolute magnification ratios Ry0 becomes 2.5, Rx0 becomes 1.5, the relative magnification ratios Ry1 becomes 5/6, Rx1 becomes 3/4.

FIG. 15B is a diagram illustrating an image formed by multiplying each odd line into three lines and multiplying each even line into two lines in the sub-scanning direction Y, and multiplying each odd-numbered dot into two dots and multiplying each odd-numbered dot into one dot in the main-scanning direction X with jagged image correcting operation. In FIG. 15B, large dots represent not-corrected-dots, and small dots represent corrected dots by the jagged image correcting operation.

In this example, when the dot correction memory 75 receives the code information A[11:0] and the 2-bit counts A[13:12] and A[15:14], the correction memory 75 generates different corrected dot information depending on the 2-bit counts A[13:12] and/or A[15:14] to output the corrected dot information to the video data output device 76. Therefore, the diagonal boundaries are smoothed, but the image preserves features of the original image data.

In the above-described example, the dot corrector 7 of the present invention is implemented in the internal interface (I/F) 6, however the dot corrector 7 may also be implemented in the controller 3 or the engine driver 4, as further examples.

Furthermore, the image data processing method and apparatus of the present invention is not limited to laser printers, but can also apply to image forming apparatuses and image display apparatuses that manipulate bit mapped image, for example, digital photocopiers, plain paper facsimiles, optical printers such as LED printers, monitors such as LCD monitors, CRT monitors, etc.

As described above, the novel image data processing method and apparatus of the present invention can generate versatile images at a relatively wide range of magnification ratios from an original image data.

Further, the novel image data processing method and apparatus of the present invention can generate a required output image resolution satisfying a required magnification ratio from various input image resolutions in a relatively simple manner.

Furthermore, the novel image data processing method and apparatus of the present invention can generate versatile magnification images of which image quality is enhanced by correcting for jagged images.

Obviously, numerous modifications and variations of the present invention are possible in light of the above teachings. For example, features described for certain embodiments may be combined with other embodiments described herein. It is therefore to be understood that within the scope of the appended claims, the present invention may be practiced otherwise than as specifically described herein.

This document is based on Japanese patent application No. 11-163940 filed in the Japanese Patent Office on Jun. 10, 1999, the entire contents of which are hereby incorporated herein by reference.

What is claimed as new and is desired to be secured by letters patents of the United States:

1. An image data processing method for processing original image data that is bit mapped in a main-scanning direction X and a sub-scanning direction Y, the method comprising:

first multiplying first linearly aligned dots of odd lines in the main-scanning direction X of the original bit mapped image data by a positive integer Dy to generate Dy lines of linearly aligned dots adjoining each other in the sub-scanning direction Y as a first group of the sub-scanning direction Y;

second multiplying second linearly aligned dots of even lines in the main-scanning direction X of the original bit mapped image data, which follow the first linearly aligned dots, by a positive integer Ry to generate Ry lines of linearly aligned dots adjoining each other in the sub-scanning direction Y as a second group of the sub-scanning direction Y, wherein the integers Dy and Ry are determined based on a ratio DPIin/DPIout between an image resolution of an input original image DPIin and an image resolution of an output image DPIout, and Dy and Ry satisfy (Dy+Ry)/2=DPIin/DPIout; and multiplying further following linearly aligned dots in the main-scanning direction X of the original bit mapped image data by repeating said first and second multiplying.

2. A method according to claim 1, further comprising:

correcting dots that have been generated by the first and second multiplying steps to reduce jagged images of the multiplied bit mapped image.

3. A method according to claim 1, further comprising:

third multiplying dots at a first position of the main-scanning direction X of the original bit mapped image data by a positive integer Dx to generate Dx dots adjoining each other in the main-scanning direction X as a first group of the main-scanning direction X;

fourth multiplying dots al a second position of the main-scanning direction X, following the first position, of the original bit mapped image data by a positive integer Rx to generate Rx dots adjoining each other in the main-scanning direction X as a second group of the main-scanning direction X; and multiplying dots at further following positions in the main-scanning direction X of the original bit mapped image data by repeating the third and fourth multiplying steps.

4. A method according to claim 3, wherein the positive integer Dy for the sub-scanning direction Y and the positive integer Dx for the main-scanning direction X satisfy a required output image resolution, and the positive integer Ry for the sub-scanning direction Y and the positive integer Rx for the main-scanning direction X satisfy a required output magnification ratio.

5. A method according to claim 3, further comprising:

correcting dots that have been generated by the multiplying steps to reduce jagged images of the multiplied bit mapped image.

6. A method according to claim 1, further comprising:

recognizing shapes of boundaries between a black dot region and a white dot region in a region including a target dot being multiplied and dots surrounding the target dot of the bit mapped image;

generating code information corresponding to the recognized shapes;

generating corrected dot data according to the generated code information;

replacing data of which dot bad been generated in the dot multiplying steps with the generated corrected dot data; and repeating from the recognizing step to the replacing step while changing the target dot one to the other.

7. A method according to claim 3, further comprising:

recognizing shapes of boundaries between a black dot region and a white dot region of a region including a target dot being multiplied and dots surrounding the target dot of the bit mapped image;

generating code information corresponding to the recognized shapes;

generating corrected dot data according to the generated code information;

replacing data of which dot had been generated in the dot multiplying steps with the generated corrected dot data; and repeating from the recognizing step to the replacing step while changing the target dot one to the other.

8. An image data processing method for processing original image data that is bit mapped in a main-scanning direction X and a sub-scanning direction Y, the method comprising:

first multiplying dots at a first position of odd lines of the main-scanning direction X of the original bit mapped image data by a positive integer Dx so as to generate Dx dots adjoining each other in the main-scanning direction X as a first group of the main-scanning direction X;

second multiplying dots at a second position of even lines of the main-scanning direction X, following the first position, of the original bit mapped image data by a positive integer Rx to generate Rx dots adjoining each other in the main-scanning direction X as a second group of the main-scanning direction X, wherein the integers Dx and Rx are determined based on a ratio DPIin/DPIout between an image resolution of an input original image DPIin and an image resolution of an output image DPIout, and Dx and Rx satisfy (Dx+Rx)/2=DPIin/DPIout; and multiplying dots at further following positions in the main-scanning direction X of the original bit mapped image data by repeating the first and second multiplying.

9. A method according to claim 8, further comprising:

correcting dots that have been generated by the first and second multiplying steps to reduce jagged images of the multiplied bit mapped image.

10. A method according to claim 8, further comprising:

recognizing shapes of boundaries between a black dot region and a white dot region of a region including a target dot being multiplied and dots surrounding the target dot of the bit mapped image;

generating code information corresponding to the recognized shapes;

generating corrected dot data according to the generated code information;

replacing data of which dot had been generated in the dot multiplying steps with the generated corrected dot data; and repeating from the recognizing step to the replacing step while changing the target dot one to the other.

11. An image data processing apparatus for processing original image data that is bit mapped in a main-scanning direction X and a sub-scanning direction Y, the apparatus comprising:

a memory device configured to store a positive integer Dy for the sub-scanning direction Y and a positive integer Ry for the sub-scanning direction Y;

an image memory device configured to store the original bit mapped image in the main-scanning direction X and in the sub-scanning direction Y;

a memory control device configured to circularly and repetitively store data of linearly aligned dots in the main-scanning direction X of the original bit mapped image data in the image memory device at Dy times for linearly aligned dots in the main-scanning direction X as a first group of odd lines of the sub-scanning direction Y, and at Ry times for following linearly aligned dots in the main-scanning direction X as a second group of even lines of the sub-scanning direction Y, alternatively, wherein the integers Dy and Ry are determined based on a ratio DPIin/DPIout between an image resolution of an input original image DPIin and an image resolution of an output image DPIout, and Dy and Ry satisfy (Dy+Ry)/2=DPIin/DPIout; and a data output device configured to output the circularly and repetitively stored data in the image memory device.

12. An apparatus according to claim 11, wherein the data output device comprises a jagged image correcting device configured to correct jagged images according to a recognition of shapes of boundaries between a black dot region and a white dot region of a region including the target dot being multiplied and dots surrounding the target dot of the bit mapped image.

13. An apparatus according to claim 12, wherein the jagged image correcting device comprises a dot sampling device configured to sample dot data in the region including the target dot being multiplied and dots surrounding the target dot of the bit mapped image, a characteristics recognizing device configured to recognize shapes of boundaries between the black dot region and the white dot region of the sampled dot data and to generate code information corresponding to the recognized shape, and a dot data output device configured to output dot data according to the generated code information.

14. An apparatus according to claim 13, wherein the jagged image correcting device comprises a count control device configured to count the circularly and repetitively read data of an identical target dot from the image memory device in the sub-scanning direction Y, and to initialize the count to zero when the count reaches the first positive integer Dy and when the count reaches the second positive integer Ry, alternatively; and wherein the dot data output device is further configured to output dot data according to the code information generated by the characteristics recognizing device and the count output from the count control device.

15. An image data processing apparatus for processing original image data that is bit mapped in a main-scanning direction X and a sub-scanning direction Y, the apparatus comprising:

a memory device configured to store a positive integer Dx for the main-scanning direction X and a positive integer Rx for the main-scanning direction X;

a data output device configured to repetitively output identical target dot data at Dx times as a first group of odd lines of the main-scanning direction X, and repetitively output following identical target dot data at Rx times in the main-scanning direction X as a second group of even lines of the main-scanning X, alternatively, wherein the integers Dx and Rx are determined based on a ratio DPIin/DPIout between an image resolution of an input original image DPIin and an image resolution of an output image DPIout, and Dx and Rx satisfy (Dx+Rx)/2=DPIin/DPIout.

16. An apparatus according to claim 15, wherein the data output device comprises a jagged image correcting device configured to correct jagged images according to a recognition of shapes of boundaries between a black dot region and a white dot region of a region including the target dot being multiplied and dots surrounding the target dot of the bit mapped image.

17. An apparatus according to claim 16, wherein the jagged image correcting device comprises an dot sampling device configured to sample dot data in the region including the target dot being multiplied and dots surrounding the target dot of the bit mapped image, a characteristics recognizing device configured to recognize shapes of boundaries between the black dot region and the white dot region of the sampled dot data and to generate code information corresponding to the recognized shape, and a dot data output device configured to output dot data according to the generated code information.

18. An apparatus according to claim 17, wherein the jagged image correcting device comprises a count control device configured to count the repetitively output data of an identical target dot from the image memory device in the main-scanning direction X, and to initialize the count to zero when the count reaches the first positive integer Dx and when the count reaches the second positive integer Rx, alternatively; and wherein the dot data output device is further configured to output dot data according to the code information generated by the characteristics recognizing device and the count output from the count control device.

19. An apparatus according to claim 15, further comprising:

an image memory device configured to store the original bit mapped image in the main-scanning direction X and in the sub-scanning direction Y;

a memory control device configured to circularly and repetitively store data of linearly aligned dots in the main-scanning direction X of the original bit mapped image data in the image memory device at a positive integer Dy times for linearly aligned dots in the main scanning direction X as a first group of the sub-scanning direction Y, and at a positive integer Ry times for following linearly aligned dots in the main-scanning direction X as a second group of the sub-scanning direction Y, alternatively.

20. An apparatus according to claim 19, wherein the data output device comprises a jagged image correcting device configured to correct jagged images according to a recognition of shapes of boundaries between a black dot region and a white dot region of a region including the target dot being multiplied and dots surrounding the target dot of the bit mapped image.

21. An apparatus according to claim 20, wherein the jagged image correcting device comprises a dot sampling device configured to sample dot data in the region including the target dot being multiplied and dots surrounding the target dot of the bit mapped image, a characteristics recognizing device configured to recognize shapes of boundaries between the black dot region and the white dot region of the sampled dot data and to generate code information corresponding to the recognized shape, and a dot data output device configured to output dot data according to the generated code information.

22. An apparatus according to claim 21, wherein the jagged image correcting device comprises a count control device configured to count the circularly and repetitively read data of an identical target dot from the image memory device in the sub-scanning direction Y as a Y count, and to initialize the count to zero when the count reaches the positive integer Dy and when the count reaches the positive integer Ry, alternatively, and to count the repetitively output data of an identical target dot from the image memory device in the main-scanning direction X as an X count, and initialize the X count to zero when the count reaches the positive integer Dx and when the count reaches the positive integer Rx, alternatively; and wherein the dot data output device is further configured to output dot data according to the code information generated by the characteristics recognizing device and the Y count and the X count output from the count control device.

23. An image data processing apparatus for processing original image data that is bit mapped in a main-scanning direction X and a sub-scanning direction Y, the apparatus comprising:

means for storing a positive integer Dy for the sub-scanning direction Y and a positive integer Ry for the sub-scanning direction Y;

means for storing the original bit mapped image in the main-scanning direction X and in the sub-scanning direction Y;

means for controlling the image storing means to circularly and repetitively store data of linearly aligned dots in the main-scanning direction X of the original bit mapped image data in the image storing means at Dy times for first linearly aligned dots in the main scanning direction X as a first group of odd lines of the sub-scanning direction Y, and at Ry times for-second linearly aligned dots, following the first linearly aligned dots, in the main-scanning direction X as a second group of even lines of the sub-scanning direction Y, alternatively, wherein the integers Dy and Ry are determined based on a ratio DPIin/DPIout between an image resolution of an input original image DPIin and an image resolution of an output image DPIout, and Dy and Ry satisfy (Dy+Ry)/2=DPIin/DPIout; and means for outputting the circularly and repetitively stored data in the image storing means.

24. An image data processing apparatus for processing original image data that is bit mapped in a main-scanning direction X and a sub-scanning direction Y, the apparatus comprising:

means for storing a positive integer Dx for the main-scanning direction X and a positive integer Rx for the main-scanning direction X;

means for repetitively outputting identical target dot data at Dx times as a first group of odd lines of the main-scanning direction X, and repetitively output following identical target dot data integer Rx times in the main-scanning direction X as a second group of even lines of the main-scanning direction X, alternatively, wherein the integers Dx and Rx are determined based on a ratio DPIin/DPIout between an image resolution of an input original image DPIin and an image resolution of an output image DPIout, and Dx and Rx satisfy (Dx+Rx)/2=DPIin/DPIout.

25. An image data processing apparatus for processing original image data that is bit mapped in a main-scanning direction X and a sub-scanning direction Y, the apparatus comprising:

means for storing a positive integer Dy for the sub-scanning direction Y, a positive integer Ry for the sub-scanning direction Y, a positive integer Dx for the main-scanning direction X, and a positive integer Rx for the main-scanning direction X;

means for storing the original bit mapped image in the main-scanning direction X and in the sub-scanning direction Y;

means for controlling the image storing means to circularly and repetitively store data of linearly aligned dots in the main-scanning direction X of the original bit mapped image data in the image storing means at Dy times for first linearly aligned dots in the main scanning direction X as a first group of odd lines of the sub scanning direction Y, and at Ry times for second linearly aligned dots, following the first linearly aligned dots, in the main-scanning direction X as a second group of even lines of the sub-scanning direction Y, alternatively, wherein the integers Dy and Ry are determined based on a ratio DPIin/DPIout between an image resolution of an input original image DPIin and an image resolution of an output image DPIout, and Dy and Ry satisfy (Dy+Ry)/2=DPIin/DPIout; and means for repetitively outputting first identical target dot data at Dx times as a first group of the main-scanning direction X, and repetitively outputting second identical target dot data, following the first identical target dot data, at Rx times in the main-scanning direction X as a second group of the main-scanning direction X, alternatively.

* * * * *